US010081498B2

United States Patent
Petryshen et al.

(10) Patent No.: US 10,081,498 B2
(45) Date of Patent: Sep. 25, 2018

(54) LUG LOADER

(71) Applicant: USNR, LLC, Woodland, WA (US)

(72) Inventors: Larry Petryshen, Salmon Arm (CA); James Jackson, Salmon Arm (CA); David Howes, Salmon Arm (CA); Thomas Congdon, Salmon Arm (CA)

(73) Assignee: USNR, LLC, Woodland, WA (US)

( * ) Notice: Subject to any disclaimer, the term of this patent is extended or adjusted under 35 U.S.C. 154(b) by 0 days.

(21) Appl. No.: 15/582,580

(22) Filed: Apr. 28, 2017

(65) Prior Publication Data
US 2017/0233195 A1    Aug. 17, 2017

Related U.S. Application Data

(63) Continuation of application No. 15/167,618, filed on May 27, 2016, now Pat. No. 9,637,321, which is a
(Continued)

(51) Int. Cl.
*B65G 47/86* (2006.01)
*B65G 47/88* (2006.01)
(Continued)

(52) U.S. Cl.
CPC ........... *B65G 47/847* (2013.01); *B65G 43/08* (2013.01); *B65G 47/248* (2013.01);
(Continued)

(58) Field of Classification Search
CPC .......... B65G 47/847; B65G 2201/0282; B65G 47/8861
See application file for complete search history.

(56) References Cited

U.S. PATENT DOCUMENTS

| 5,662,203 A | * | 9/1997 | St-Pierre | B65G 47/847 |
| | | | | 198/459.5 |
| 5,752,594 A | * | 5/1998 | Fournier | B23Q 7/001 |
| | | | | 198/803.9 |

(Continued)

FOREIGN PATENT DOCUMENTS

| CA | 2148322 | * | 11/1996 | B27B 31/00 |
| CA | 2148322 A1 | * | 11/1996 | B27B 31/00 |

(Continued)

*Primary Examiner* — Thomas Randazzo
(74) *Attorney, Agent, or Firm* — Schwabe Williamson & Wyatt, P.C.

(57) ABSTRACT

Embodiments provide an electric lug loader system. An electric lug loader may include a shaft assembly rotatably mounted to a frame that extends across a flow path. The shaft assembly may have shafts arranged radially around, and parallel to, the rotational axis of the shaft assembly, clamp members arranged along each of the shafts, support members arranged radially around the rotational axis and across the flow path, and electric drives coupled to the shafts. Conveyors may be coupled with the frame and spaced apart across the flow path upstream and/or downstream of the shaft assembly. Additional drives may be coupled with the shaft assembly and the conveyors. A controller may be configured to synchronize the drives to engage successive workpieces between the clamp members and the support members and deposit the workpieces onto a lugged conveyor. Other embodiments provide related methods and systems.

20 Claims, 13 Drawing Sheets

Related U.S. Application Data continuation of application No. 14/297,504, filed on Jun. 5, 2014, now Pat. No. 9,376,270.

(51) Int. Cl.
*B65G 43/08* (2006.01)
*B65G 47/32* (2006.01)
*B65G 47/252* (2006.01)
*B65G 47/248* (2006.01)
*B65G 47/90* (2006.01)

(52) U.S. Cl.
CPC .......... *B65G 47/252* (2013.01); *B65G 47/32* (2013.01); *B65G 47/8846* (2013.01); *B65G 47/8861* (2013.01); *B65G 47/8876* (2013.01); *B65G 47/904* (2013.01); *B65G 2201/0217* (2013.01); *B65G 2201/0282* (2013.01); *Y10T 29/49718* (2015.01)

(56) References Cited

U.S. PATENT DOCUMENTS

| | | | | |
|---|---|---|---|---|
| 6,991,423 | B2* | 1/2006 | Hogue | B65G 57/035 414/791.6 |
| 7,004,303 | B2* | 2/2006 | Rennie | B65G 47/30 198/459.5 |
| 7,547,182 | B2* | 6/2009 | Hogue | B65G 57/005 414/789.5 |
| 8,387,774 | B2* | 3/2013 | St-Pierre | B65G 47/8823 198/459.5 |
| 9,376,270 | B2* | 6/2016 | Petryshen | B65G 47/248 |
| 2015/0353296 | A1* | 12/2015 | Petryshen | B65G 47/248 198/463.4 |

FOREIGN PATENT DOCUMENTS

| | | | | |
|---|---|---|---|---|
| CA | 2151768 A1 * | 12/1996 | | B65G 47/847 |
| CA | 2151768 A1 * | 5/1998 | | B65G 47/847 |

\* cited by examiner

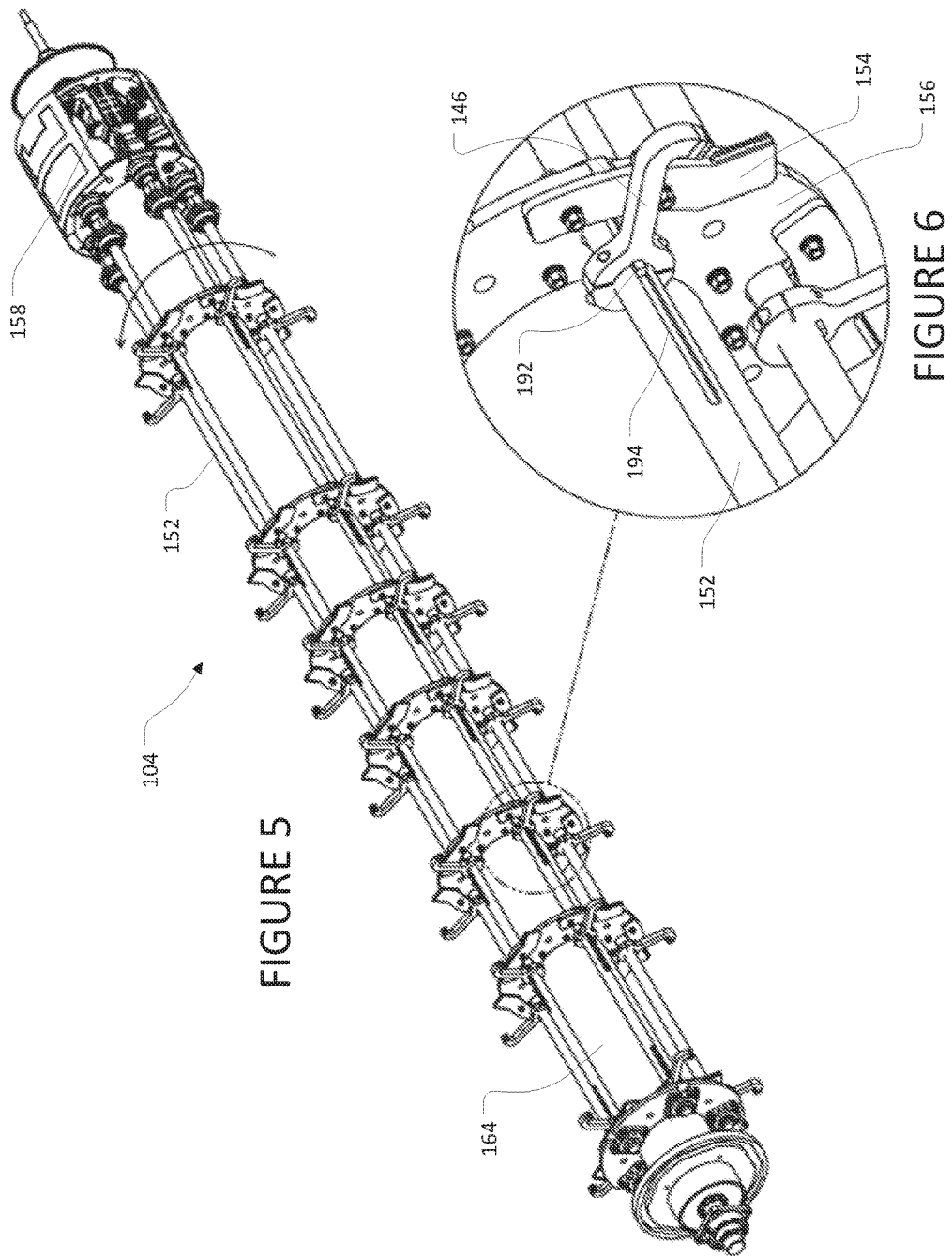

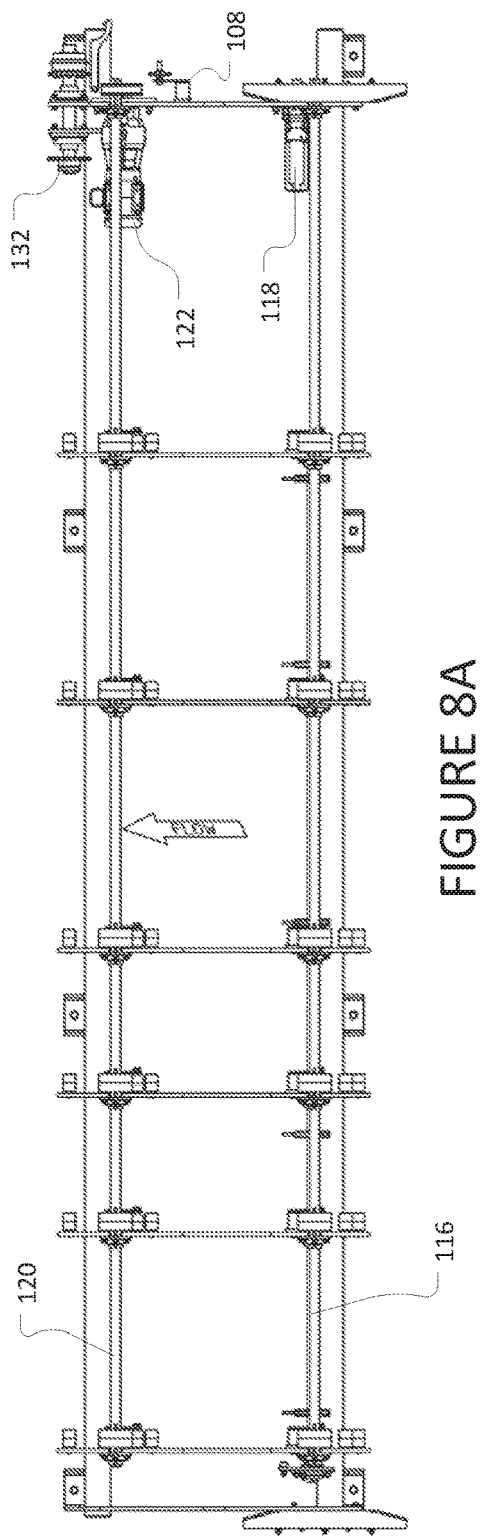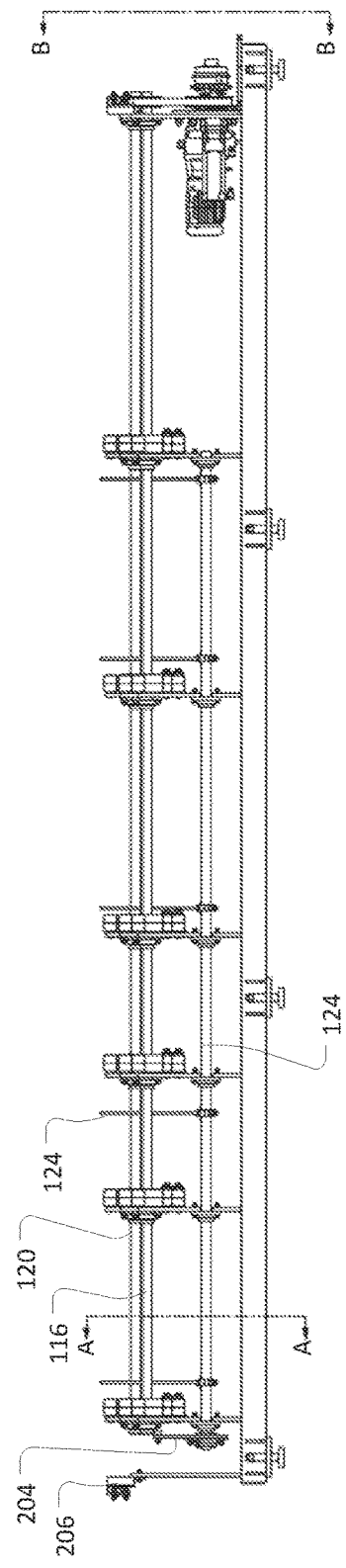
FIGURE 8A
FIGURE 8B

LUG LOADER

CROSS REFERENCE TO RELATED APPLICATION

The present application is a continuation of U.S. patent application Ser. No. 15/167,618, filed May 27, 2016, which is a continuation of U.S. patent application Ser. No. 14/297,504, filed Jun. 5, 2014, now U.S. Pat. No. 9,376,270, all entitled "LUG LOADER," the entire disclosures of which are incorporated by reference herein.

BACKGROUND

Conventional claw-type lug loaders rely on hydraulic/air actuators and rubber bands to grasp boards. The boards are typically fed to the lug loader under pressure created by a backlog. As such, the lug loaders may not function well in the absence of a backlog or with feathered edge materials. Many of the lug loaders tend to perform poorly at higher speeds, especially where the lumber is variable in width or thickness, bowed, cupped, crooked, or has a non-uniform size and shape. Finally, conventional claw-type lug loaders often mark one or more surfaces of the boards during handling. This can reduce the value of the boards.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 5 illustrates a perspective views of a workpiece singulator;

FIG. 6 illustrates an enlarged view of a portion of FIG. 5;

FIGS. 8A-8B illustrate plan and side elevational views, respectively, of a conveyor assembly;

DETAILED DESCRIPTION OF DISCLOSED EMBODIMENTS

Figure 1A:
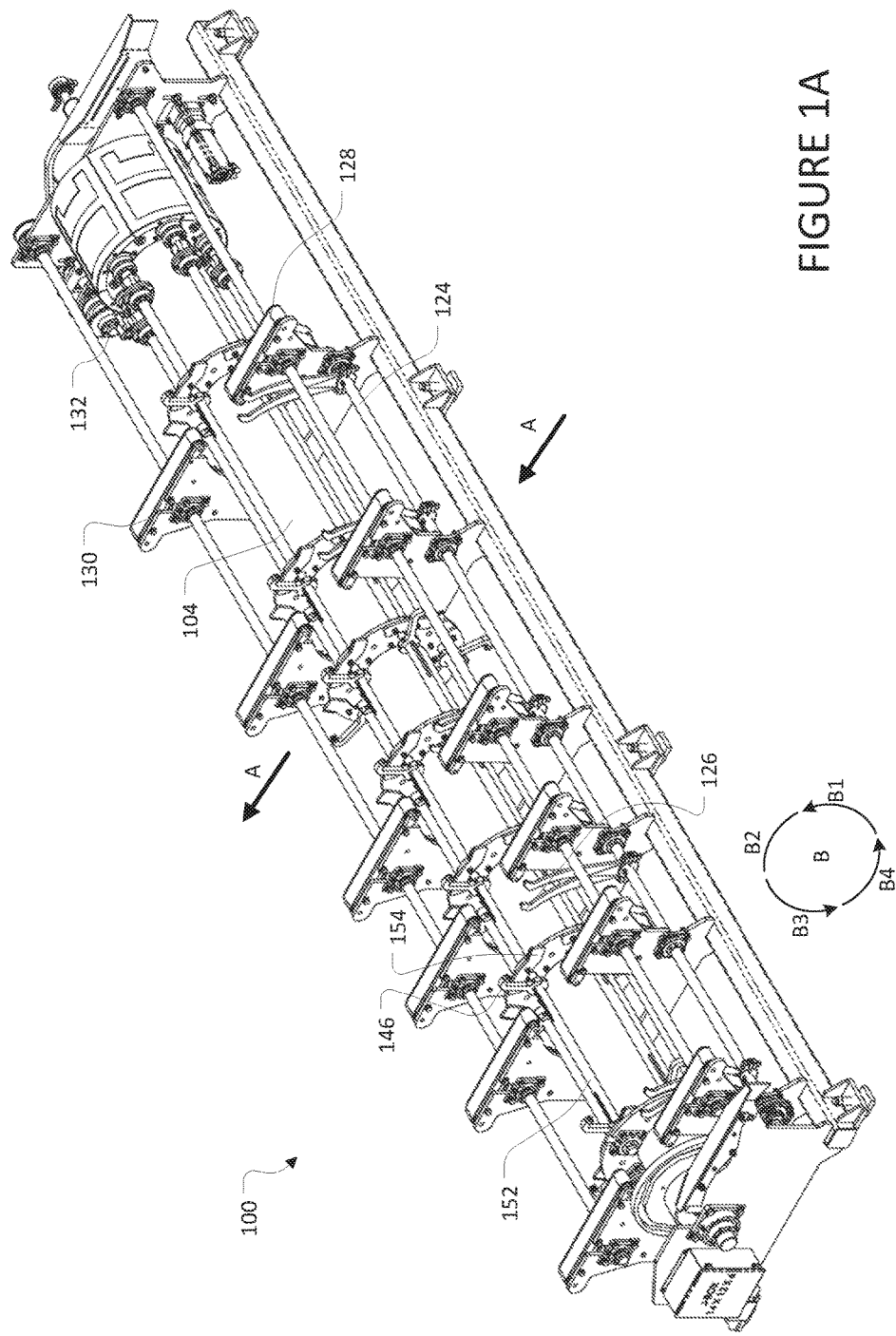
FIG. 1A illustrates a perspective view of a lug loader.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Embodiments of a lug loader and related apparatuses, methods, and systems are provided herein. In various embodiments, a lug loader may include a plurality of clamp members movable between a clamping position and a releasing position. The clamping and releasing positions of the clamp members may be independently controllable, selectively and on demand, through either remote operator input or automatically through defined recipes (e.g., according to an algorithm or workpiece dimensions). In some embodiments, the clamping and releasing positions can be controlled on a batch basis (e.g., using predetermined positions for common work piece batches) or on an individual workpiece basis. In other embodiments, the clamping and releasing positions may be based on workpiece dimensions, angle of workpiece rotation, and/or torque sensing.

The lug loader may be used to selectively transfer workpieces from an infeed to an outfeed and/or into the lug spaces of a lugged conveyor. In various embodiments, a control system may be coupled with the lug loader. The control system may be configured to selectively operate/index the infeed based on workpiece dimensions to reduce backlog pressure.

The control system may be configured to determine or select actuation points at which the shafts are rotated to move the clamp members into engagement with the corresponding workpieces (a clamp actuation point) and/or away from engagement with the corresponding workpieces (a release actuation point). The actuation points may be points along a circular path traveled by a shaft as the shaft revolves around the rotational axis of the shaft assembly/singulator.

For example, if the shaft is considered to be at 0 degrees at the bottom-most point of the circular path and 180 degrees at the upper-most point of the circular path, the clamp actuation point may be a point within the range of 90-180 degrees and the clamp release point may be a point within the range of 181-270 degrees. The portion of the workpiece that is engaged by the clamp members is partially a function of the location of the clamp actuation point along the circular path. Similarly, the angle of the workpiece as the workpiece is released is partially a function of the location of the release actuation point along the circular path. As such, the ability to adjust the actuation points to earlier or later points along the circular path may allow the singulator/lug loader to handle workpieces of various types and dimensions without relying on backlog pressure.

The control system may be configured to control the shafts to rotate at the actuation points to engage or disengage the clamp members with the workpieces. In some embodiments the control system may be configured to control the drives to rotate the shafts at the actuation points by actuating the drives individually at time intervals that correspond to the actuation points. In other embodiments the control system may be configured to adjust the actuation points to accommodate variations in workpiece thickness, dimensions, skew angle, intended use (e.g., avoid marking higher grade boards), and various other characteristics. Optionally, the control system may be configured to determine, select, or adjust the clamp/release actuation point(s) based at least in part on one or more of workpiece dimensions/characteristics, input from a human operator, rotational speed of the shaft assembly, speed(s) of infeed/outfeed conveyors, time required for rotation of the shaft, and/or pre-programmed set points (e.g., based on individual workpiece or batch characteristics).

The control system may also be configured to determine, adjust, and/or select the clamping and releasing positions for the clamp members based on workpiece dimensions/characteristics, input from a human operator, rotational speed of the shaft assembly, speed(s) of infeed/outfeed conveyors, time required for rotation of the shaft, and/or pre-programmed set points (e.g., based on individual workpiece or batch characteristics). Whereas the clamp actuation/release points are points along a circular path of revolution around the rotational axis of the shaft assembly/singulator, the clamping and releasing positions refer to positions of the clamp members on their respective shafts. As such, the clamping and releasing positions of a clamp member is at least partially a function of the rotational angle of its corresponding shaft. In some embodiments, the controller may be configured to adjust the clamping position by adjusting the corresponding rotational angle of the shaft (e.g., rotating the shaft more to engage thinner workpieces, rotating it less to engage thicker workpieces).

The clamping and releasing positions may be defined in various ways among embodiments. In some embodiments, the clamping/release position may be determined or defined in terms of time (e.g., shaft is rotated at a specified speed in a specified direction for a specified duration of time). In other embodiments, the clamping/releasing position may be determined or defined in terms of position (e.g., in terms of the detected rotational angle of the shaft or detected angle of the corresponding clamp members). In still other embodiments, the clamping/releasing position may be determined or defined in terms of torque (e.g., shaft is rotated until a specified amount of torque is applied, as measured by current sensing on the shaft's corresponding drive/motor).

The clamping and releasing positions may also be configurable (e.g., by the control system and/or by a human operator) in various ways among embodiments. For example, in some embodiments that do not use torque sensing to determine clamping/releasing positions, the drives (e.g., motors) that drive the shafts may have a maximum current limit in order to limit the amount of torque and thereby avoid crushing the workpiece as the clamp members engage the workpiece. Thus, in some embodiments the drivers of the shafts may have a selectively configurable maximum current limit that allows the control system and/or operator to limit the force applied to the workpiece. The maximum current limit may be adjustable on a batch basis, for example, such that the maximum current can be raised for handling workpieces capable of withstanding greater force (e.g., Doug fir boards) and lowered for handling workpieces that mark easily (e.g., cedar boards).

In various embodiments, the clamp actuation point, release actuation point, the clamping and releasing positions, and/or other variables such as maximum current limit, rotational speed of the shaft assembly, speed(s) of infeed/outfeed conveyors, time required for rotation of the shaft, and/or pre-programmed set points (e.g., based on individual workpiece or batch characteristics) may be adjusted or controlled individually by input from a human operator and/or automatically by the control system. In various embodiments, the control system may be programmed with instructions operable, when executed by a processor, to control various operations of the singulator/lug loader based on sensor data, workpiece/batch characteristics, or a set of pre-determined operational parameters. For example, for a 1×4 board, the control system may be programmed to clamp the board at 90 degrees of rotation, release the board at 190 degrees of rotation, and set the clamping position based on a target gap of 0.75" between the end of the clamp member and the corresponding support member when the clamp members are in the clamping position. As another example, for a 2×10 board, the control system may be programmed to clamp the board at 90 degrees of rotation, release the board at 185 degrees of rotation, and set the clamping position based on a target gap of 1.70" between the end of the clamp member and the corresponding support member when the clamp members are in the clamping position.

In some embodiments, the lug loader and/or various components thereof may be driven electrically, without air and hydraulics.

In accordance with various embodiments, a lug loader may include a workpiece singulator and a conveyor assembly. The workpiece singulator and/or the conveyor assembly may be driven by electric drives. In some embodiments, the workpiece singulator may have clamp members that are selectively actuable by corresponding electric drives to grasp and release workpieces. Thus, the workpiece singulator may lack hydraulic/air actuators or rubber bands commonly used in conventional board singulator devices.

In accordance with various embodiments, a workpiece singulator may include a shaft assembly rotatably mounted to a frame. The shaft assembly may be positioned across a flow path, such that the rotational axis of the shaft assembly is transverse to the flow path. The shaft assembly may have shafts arranged radially around, and parallel to, the rotational axis of the shaft assembly. Clamp members may be arranged along each of the shafts, and each of the shafts may have a separate electric drive coupled thereto. Support members may be arranged radially around the rotational axis of the shaft assembly and spaced apart across the flow path.

In some embodiments, the shaft assembly may have a plurality of discs arranged along the rotational axis and coupled with the shafts, and the support members may be coupled with the discs.

In various embodiments, the support members may be integral with the discs. For example, the support members may be projecting portions of the outer edges of the discs. Alternatively, the support members may be coupled with the discs. In some embodiments, the shafts may be disposed through apertures (e.g., open-ended slots) in the discs, and the support members may be removably coupled with the discs and positioned across a portion of the apertures. In a particular embodiment, the shaft assembly may have five shafts, and each of the shafts may be coupled to a corresponding one of five electric drives. Other embodiments may have fewer than five shafts and corresponding electric drives, or more than five shafts and corresponding electric drives.

In any case, each of the electric drives may be selectively operable to rotate the corresponding shaft to thereby actuate the corresponding clamp members along that shaft. In some embodiments, the electric drives may be selectively operable to move the clamp members between a clamping position and a releasing position. Thus, the clamping position may correspond to a first rotational angle of the shaft, and the releasing position may correspond to a second rotational angle of the shaft. The clamping and releasing positions may be adjustable in some embodiments to thereby accommodate different workpiece thicknesses and/or applications.

Optionally, the clamp members may include tensioners that are configured to absorb force and/or dampen vibration. For example, the tensioners may include a resilient compressible material (e.g., an elastomer) disposed between a base portion and a generally opposite end portion of the clamp member. The tensioners may allow more force to be applied to thick products and/or allow more travel for thin products. Optionally, tensioners may be provided in/along the shafts to isolate the electric drives from impact and to allow further thickness range adjustment.

In some embodiments, the lug loader may include a conveyor assembly with a plurality of conveyors spaced apart across the flow path upstream and/or downstream of the shaft assembly. Optionally, some or all of the conveyors may be coupled with the frame. Additional drives may be coupled with the shaft assembly and the conveyors. In some embodiments, the conveyor assembly may have a set of infeed belts and/or outfeed belts. The infeed belts may be operable to index the workpieces on a workpiece width basis. In other embodiments, the outfeed belts may be configured to deal the workpieces into the spaces of a lugged conveyor positioned downstream of the outfeed belts. Optionally, some or all of the infeed belts may be mounted to the frame and coupled together by a common infeed shaft, and the infeed shaft may be driven by an electric drive. Similarly, some or all of the outfeed belts may be mounted to an opposite side of the frame and coupled together by a common outfeed shaft that is driven by another electric drive. Another drive may be provided to rotate the shaft assembly, such that the infeed conveyors, outfeed conveyors, shaft assembly, and each of the shafts of the shaft assembly can be driven independently of one another.

In exemplary embodiments, a control system may be endowed with one or more components of the disclosed apparatuses and/or systems and may be employed to perform one or more methods as disclosed herein. For example, in some embodiments the lug loader may be operatively coupled with a control system. In various embodiments, the control system may include a controller, such as a programmable logic controller (PLC) and/or another computing device. Optionally, the control system may also include one or more sensors (e.g., camera, photo-eye, scanner, torque sensor, pressure sensor) coupled with the controller. The controller may be operatively coupled with some or all of the drives. In some embodiments the controller may be configured to control the drives of the workpiece singulator, the conveyor assembly, and/or other devices upstream or downstream of the workpiece singulator. In various embodiments, the controller may be configured to synchronize the drives to engage successive workpieces between the clamp members and the support members and deposit the workpieces onto a lugged conveyor.

In some embodiments, the drives of the shaft assembly may be electric drives, and the electric drives may be in communication with the controller through a slip ring assembly coupled with the shaft assembly. In other embodiments, the electric drives and controller may be communicatively coupled by any other suitable device or mechanism. Optionally, the control system may include one or more sensors configured to detect the presence and/or dimensions of the workpieces, and the controller may be configured to selectively adjust/synchronize operation of some or all of the drives based at least on data from the sensor(s).

In some embodiments, the control system may be programmed with clamping/releasing positions and corresponding rotational angles of the shafts. Optionally, the clamping/releasing positions may be adjustable and/or configurable for different workpiece thicknesses. For example, the control system may be configured to control the clamping/releasing positions of the clamp members along a shaft by controlling the corresponding drive to rotate the shaft to a particular rotational angle that corresponds to the desired clamping/releasing position. In some embodiments, the control system may be programmed with one or more algorithms for determining or calculating clamping/releasing positions for an individual workpiece or a batch of workpieces based on scan data and/or input from a human operator. For example, to determine a clamping position for a given workpiece, the control system may be programmed to determine the dimensions of the workpiece based on scan data, identify a portion of the workpiece that is likely to be engaged by a distal end of a clamp member (e.g., a portion that is at a given distance from a leading edge of the workpiece), and determine the thickness of that portion of the workpiece (e.g., based on workpiece dimensions or a dimensional model of the workpiece). The control system may then use the determined thickness to retrieve a corresponding shaft rotational angle from a look-up table or database. Alternatively, the control system may use the determined thickness to calculate the desired rotational angle according to a formula or algorithm. The clamping position may be the rotational angle of the shaft at which the distal ends of the corresponding clamp members are spaced apart from the corresponding support members by a desired distance. Alternatively, the clamping/release positions may be adjustable by a human operator. The adjustable clamping/releasing positions may allow the lug loader to be adjusted for use with different workpiece types (e.g., boards, flitches, feather edge materials, workpieces with wane) and/or applications (e.g., random thickness/green mill applications, planer mill applications).

In various embodiments, the lug loader may be configured to engage successive workpieces without incoming backlog pressure and/or to tolerate a wide range of thicknesses between workpieces (e.g., 1" to 4"). In some embodiments, the lug loader may be configured to singulate/load workpieces at a speed of 250 lugs per minute (LPM) or greater. Optionally, most or all of the drives may be located at one end of the lug loader (e.g., at the non-lumber line end, at the non-lumber line end).

FIGS. 1A-3F illustrate a lug loader 100 with a workpiece singulator and a conveyor system, in accordance with various embodiments. The workpiece singulator may include a shaft assembly 104 and a shaft assembly drive 132. The conveyor system may include infeed conveyors 128 and/or outfeed conveyors 130 (FIG. 1A). Shaft assembly 104 may be rotatably mounted across the flow path (Arrow A, FIG. 1A). In some embodiments, shaft assembly 104 and infeed conveyors 128 and/or outfeed conveyors 130 may mounted to a common frame.

Figure 1B:
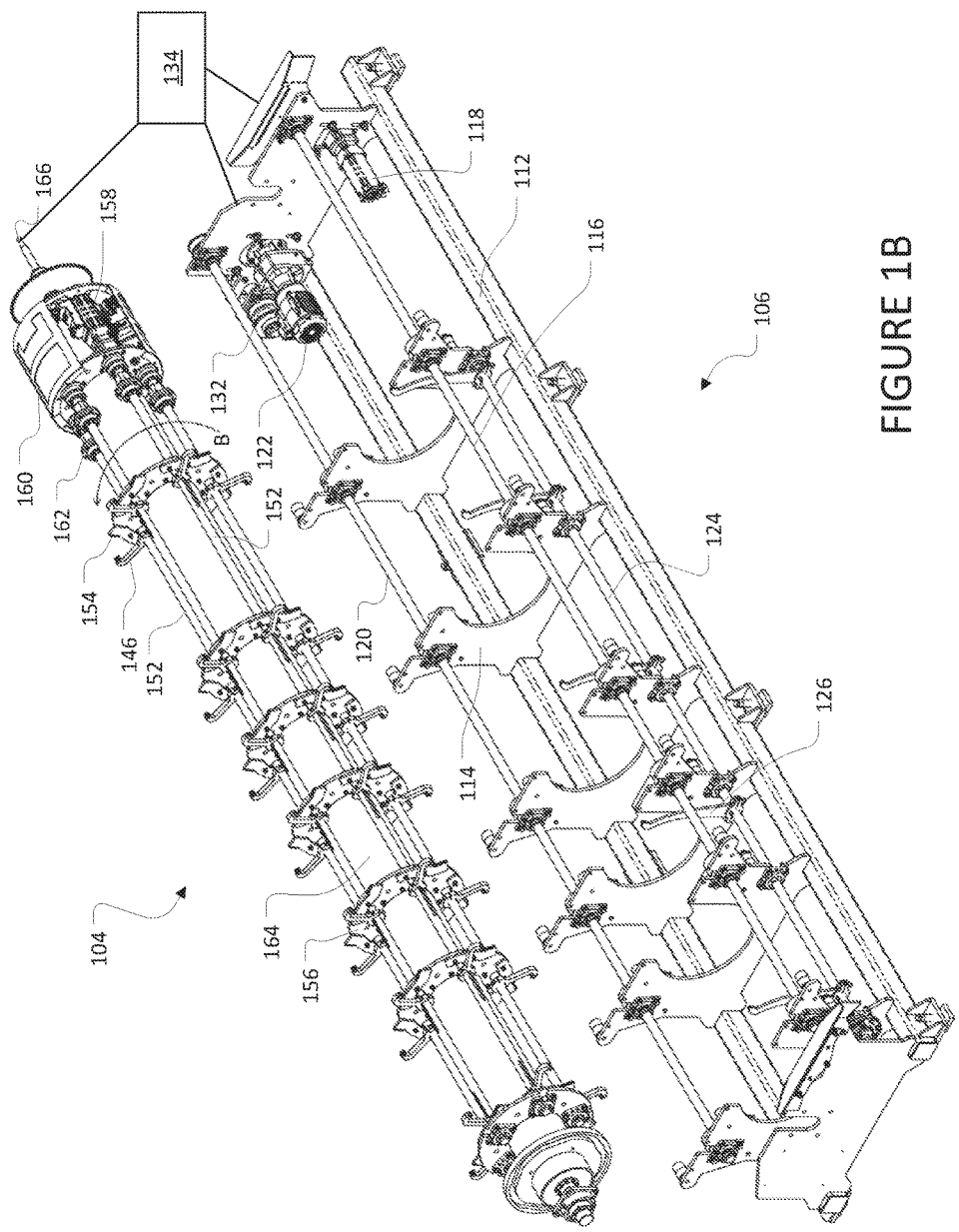
FIG. 1B illustrates a perspective view of a workpiece singulator and a conveyor system of a lug loader.

Referring now to FIG. 1B, shaft assembly 104 may include a plurality of shafts 152, a plurality of clamp members 146, a plurality of support members 154, drives 158, discs 156, a drive housing 160, shaft couplers 162, a shaft housing 164, and/or a shaft housing support 166.

Shaft housing support 166 may include one or more shafts, pipes, or the like. Shaft housing support 166 may be disposed through opposite ends of shaft housing 164 along the rotational axis of shaft assembly 104. In some embodiments, shaft housing support 166 may include a shaft that extends through the length of shaft housing 164. In other embodiments, shaft housing support 166 may include a shaft/pipe disposed through one end of shaft housing 164 and another shaft/pipe disposed through the opposite end of shaft housing 164.

Shafts 152 may be arranged radially around shaft housing 164 generally parallel to, and equidistant from, the rotational axis. Each shaft 152 may have a corresponding set of clamp members 146 which are coupled with, and spaced apart along, the shaft 152. Discs 156 may be spaced apart along the rotational axis and oriented generally orthogonal to the rotational axis. In some embodiments, discs 156 may be arranged along shaft housing 164. Shafts 152 may be coupled with corresponding portions of discs 156. Optionally, shafts 152 may be disposed through corresponding portions of discs 156 (e.g., through the outer periphery of the discs).

Each of the drives 158 may be coupled with an end of a corresponding one of shafts 152 and disposed within drive housing 160. In some embodiments, drives 158 are electric drives (e.g., electric motors, direct current (DC) motors, alternating current (AC) motors). For example, drives 158 may be servo motors. Optionally, each of drives 158 may independently include a servo motor and a gear reducer. Each of drives 158 may be independently operable to rotate a corresponding shaft 152 in opposite rotary directions to thereby move the clamp members 146 between a workpiece clamping position and a workpiece releasing position. Optionally, shafts 152 may include two or more sections joined together by one or more shaft couplers 162 for ease of assembly/maintenance.

Support members 154 may be arranged radially around the discs 156 and spaced apart across the flow path. Support members 154 may be positioned relative to the shafts 152 and clamp members 146, such that each shaft 152 is operable to move the corresponding clamp members 146 toward and away from a corresponding set of support members 154.

Referring still to FIG. 1B, conveyor system 106 may include a frame 112 with supports 114, an infeed shaft 116, an infeed drive 118, an outfeed shaft 120, and an outfeed drive 122. In some embodiments, conveyor system 106 may include stop members 126 and/or a stop member shaft 124.

Supports 114 may be spaced apart along, and oriented generally orthogonal to, a longitudinal axis of frame 112. Infeed shaft 116 may be rotatably coupled with an upstream side of frame 112. Infeed drive 118 may be coupled with, and configured to rotate, infeed shaft 116. Likewise, outfeed shaft 120 may be rotatably coupled with a downstream side of frame 112. Outfeed drive 122 may be coupled with, and configured to rotate, outfeed shaft 120. In some embodiments, stop member shaft 124 may be rotatably coupled with the upstream side of frame 112. One or more stop members 126 may be arrayed along stop member shaft 124 at intervals.

Shaft assembly 104 may be rotatably mounted to frame 112. In various embodiments, any or all of shaft assembly drive 132, infeed drive 118, and outfeed drive 122 may be mounted to frame 112. In other embodiments, shaft assembly 104 and/or shaft assembly drive 132 may be rotatably mounted to another frame or support. The number and configuration of supports 114, infeed conveyors 128, outfeed conveyors 130, and corresponding shafts/drivers may vary among embodiments. Some embodiments may lack the upstream/downstream conveyors and the corresponding conveyor shaft(s)/drive(s).

In operation, workpieces may be moved sequentially in a transverse orientation along a direction of flow (Arrow A, FIG. 1A) onto infeed conveyors 128. Infeed conveyors 128 may move each successive workpiece along the direction of flow toward shaft assembly 104. Shaft assembly 104 may be rotated in a first rotary direction, causing support members 154 and shafts 152 to move along a rotational path (Path B, FIG. 1A).

As shaft assembly 104 revolves, a set of support members 154 and a corresponding shaft 152 with clamp members 146 may be rotated upwardly toward infeed conveyors 128 along a first portion of the circular path (arrow B1, FIG. 1A). The rotation of shaft assembly 104 may bring the set of support members into engagement with a lower surface of a workpiece on infeed conveyors 128. The corresponding shaft 152 may be selectively rotated in an opposite rotary direction to bring the set of clamp members 146 arrayed thereon into engagement with an upper surface of the workpiece, thereby clamping the workpiece between the corresponding support members 154 and clamp members 146. As the rotation of shaft assembly 104 moves the set of support members 154, shaft 152, and clamp members 146 upwardly toward the top of the rotational path (arrow B2, FIG. 1A), the lagging edge of the workpiece may become elevated relative to the leading edge of the workpiece. In some embodiments, the upper surface of the workpiece may be tilted downwardly (e.g., by 25-45 degrees relative to horizontal) as the corresponding support members 154 reach the top of the rotational path.

The driver 158 of the corresponding shaft 152 may be selectively actuated to rotate shaft 152 in the first rotary direction to release the workpiece from the clamp members 146. In some embodiments, the driver 158 may be actuable to rotate the shaft 152 as shaft 152 reaches a desired location along the rotational path. For example, the shaft 152 may be rotated to move the corresponding clamp members 146 away from the workpiece when the shaft is at or near the top of the rotational path. The support members 154 may continue to support the workpiece and/or urge the workpiece in the direction of flow as the leading edge of the workpiece contacts outfeed conveyors 130, causing the workpiece to be deposited onto outfeed conveyors 130 in the initial orientation, with the lower surface in contact with the outfeed conveyor. The rotation of shaft assembly 104 may move shaft 152, support members 154, and clamp members 146 downwardly along the last portion of the rotational path (arrow B4, FIG. 1) as the outfeed conveyors 130 move the workpiece in the direction of flow.

Optionally, shaft assembly 104 may be selectively operable to flip/turn the workpiece 180 degrees about the longitudinal axis of the workpiece before depositing the workpiece onto outfeed conveyors 130. For example, the shaft 152 may be rotated to move the corresponding clamp members 146 away from the workpiece as the shaft is descending along the rotational path toward outfeed conveyors 130 (e.g., along arrow B3, FIG. 1A). As the workpiece is released, the angle of the workpiece (e.g., 70-160 degrees) and/or the greater velocity of the lagging edge of the workpiece relative to the leading edge of the workpiece may cause the workpiece to complete a 180 degree turn onto the outfeed conveyor. In some embodiments, the outfeed conveyor may be stopped or the speed of the outfeed conveyor may be varied to facilitate the turning of the workpiece.

Optionally, stop member shaft 124 and stop members 126 may be selectively operated to halt and release the workpiece on the infeed conveyors 128. In some embodiments, stop member shaft 124 may be selectively rotatable, and the rotational motion may be timed/coordinated with the flow of workpieces. Stop member shaft 124 may be rotated in the second rotary direction (opposite to the first rotary direction) to raise an upper end of cams 126 into the path of workpiece flow, such that the next successive workpiece is temporarily halted. To release the workpiece, stop member shaft 124 may be rotated in the first rotary direction to thereby lower the upper end of stop members 126, such that stop members 126 are below the lower surface of the workpiece. In some embodiments, stop members 126 and stop member shaft 124 may be used to synchronize the infeed conveyors 128 with shaft assembly 104, such that each successive workpiece is moved into position as a corresponding set of the support members is rotated upwardly into engagement with the workpiece.

In other embodiments, the infeed conveyors 128 may be controlled to move each successive workpiece into position without stop members 126 and stop member shaft 124. In still other embodiments, a stationary stop member (not shown) may be provided proximal to shaft assembly 104 (e.g., along supports 114 and/or guards 172). The stationary stop member may be a plate or other suitable item that extends upwardly into the path of flow and is positioned to engage the leading edge of a workpiece traveling toward shaft assembly 104 (e.g., on infeed conveyors 128). As a corresponding set of support members 154 engages the lower surface of the workpiece and continues along the rotational path, the leading edge of the workpiece may be lifted above the stationary stop member, allowing the workpiece to be moved in the flow direction by infeed conveyors 128 and/or shaft assembly 104.

In various embodiments, a control system 134 may be coupled with the workpiece singulator and/or the conveyor system (FIG. 1B). The control system may be configured to synchronize operations of some or all of the drives and other components of the system and/or coordinate workpiece flow with the rotation of shaft assembly 104. In some embodiments, control system 134 may include a controller (e.g., a PLC and/or a computer system). Optionally, control system 134 may further include one or more sensors.

Figure 2:
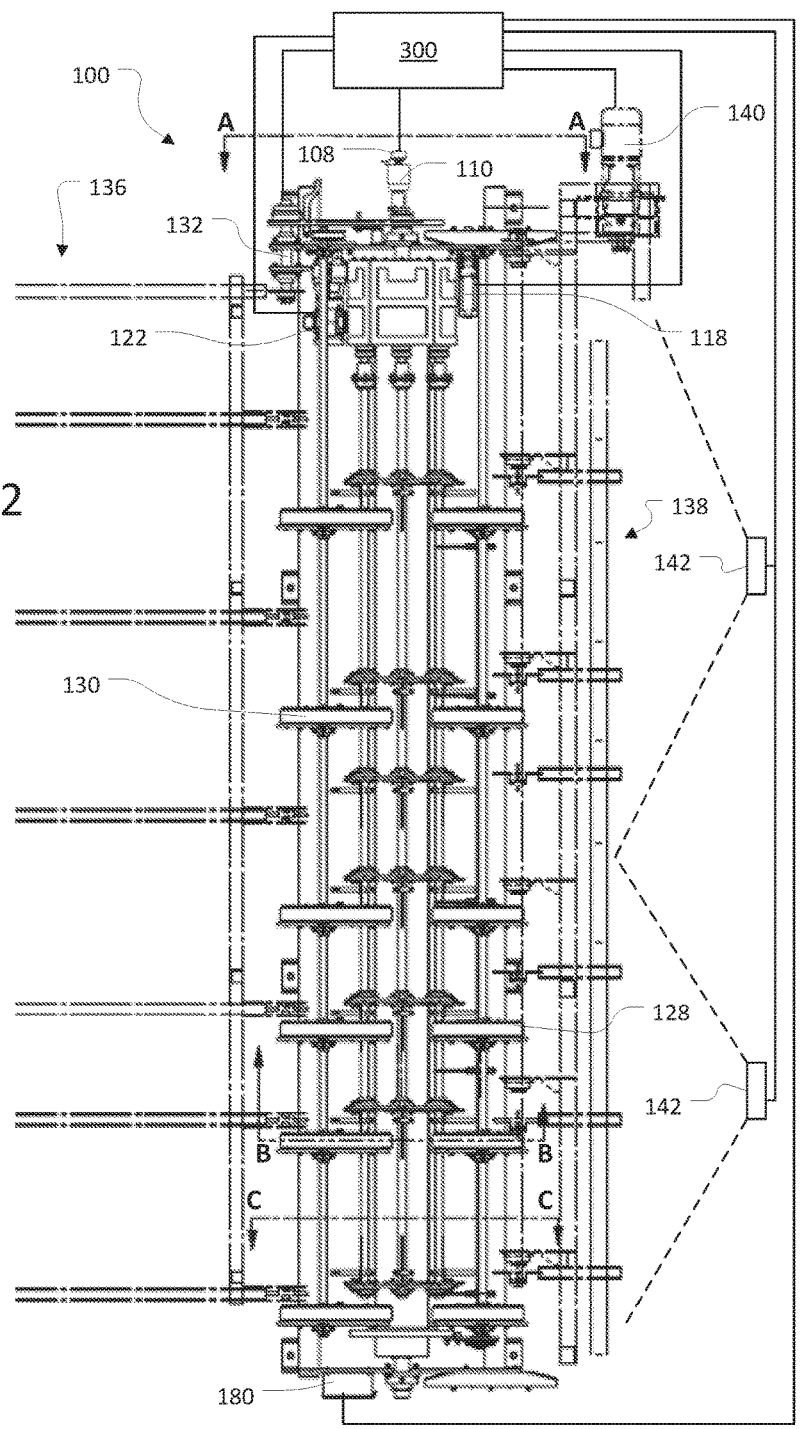
FIG. 2 illustrates a plan view of a lug loader.

In some embodiments, as shown for example in FIG. 2, shaft assembly 104 may be coupled with a slip ring 110 and/or an encoder 108. A controller 300 (e.g., a programmable logic controller and/or a computer system of control system 134) may be operatively coupled with encoder 108, infeed drive 118, outfeed drive 122, shaft assembly drive 132, and/or other components via slip ring 110. Optionally, control system 134 may include one or more sensors 142 operatively coupled with controller 300 and positioned to detect the workpieces along the flow path. In some embodiments, one or more of the sensors 142 may be configured to detect one or more workpiece dimensions. In other embodiments, one or more of the sensors may be configured to detect a position of a component (e.g., a rotary position of shaft assembly 104, a rotary position of shaft 152, a rotary position of stop member shaft 124, Various other components may also be coupled with controller 300, such as a junction box 180 (see e.g., FIG. 3F).

Optionally, lug loader 100 may be positioned between an infeed 138 and an outfeed 136. Outfeed 136 may be a lugged conveyor. Alternatively, outfeed 136 and/or infeed 138 may be a conveyor, transfer, sheet feeder, transfer table, or the like. Infeed 138 and/or outfeed 136 may each have a drive 140. Thus, infeed conveyors 128, outfeed conveyors 130, infeed 136, and outfeed 138 may be driven independently of one another. In other embodiments, infeed conveyors 128 and infeed 138 may be driven by a common drive, and/or outfeed conveyors 130 and outfeed 136 may be driven by a common drive. In still other embodiments, two or more of the infeed conveyors 128 and/or two or more of the outfeed conveyors 130 may have separate drives that are independently operable to drive the corresponding belt(s) at different speeds to adjust a skew angle of a workpiece and/or a gap between workpieces.

Figure 3A:
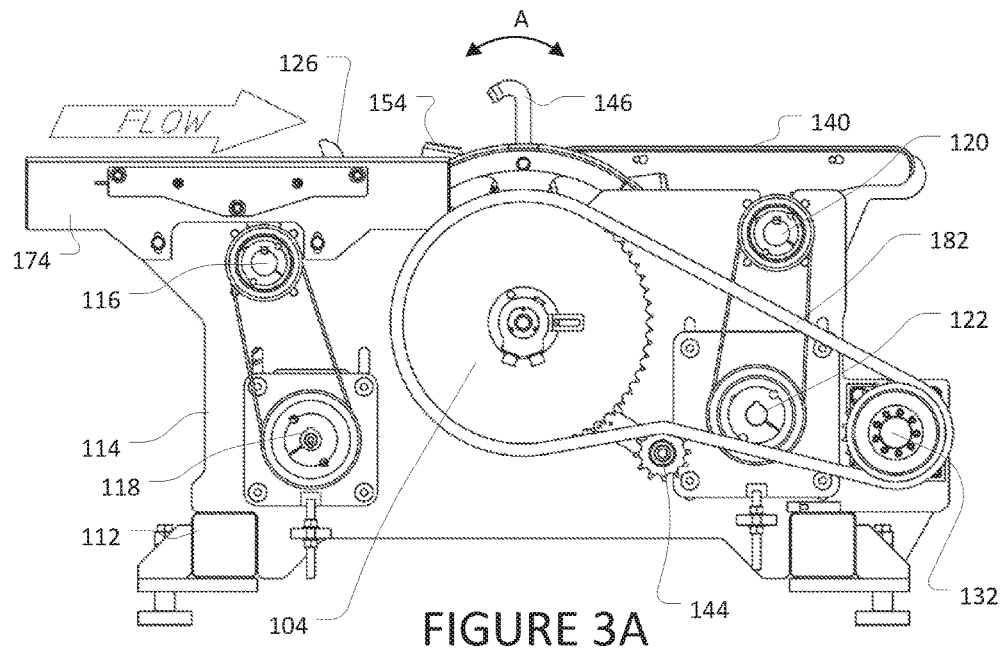
FIGS. 3A-3C illustrate sectional views taken along corresponding lines of FIG. 2.
Figure 3B:
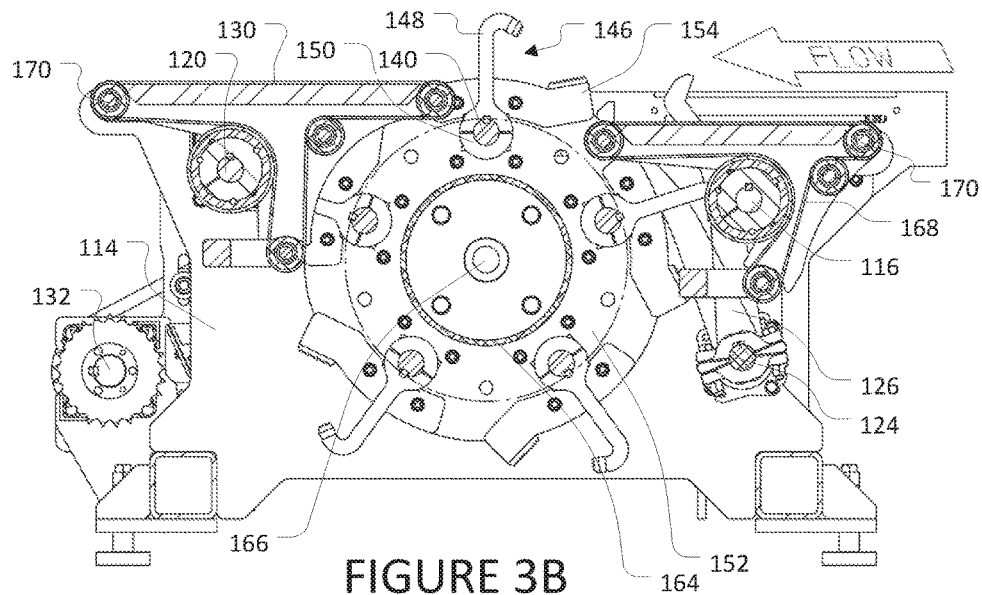
Figure 3C:
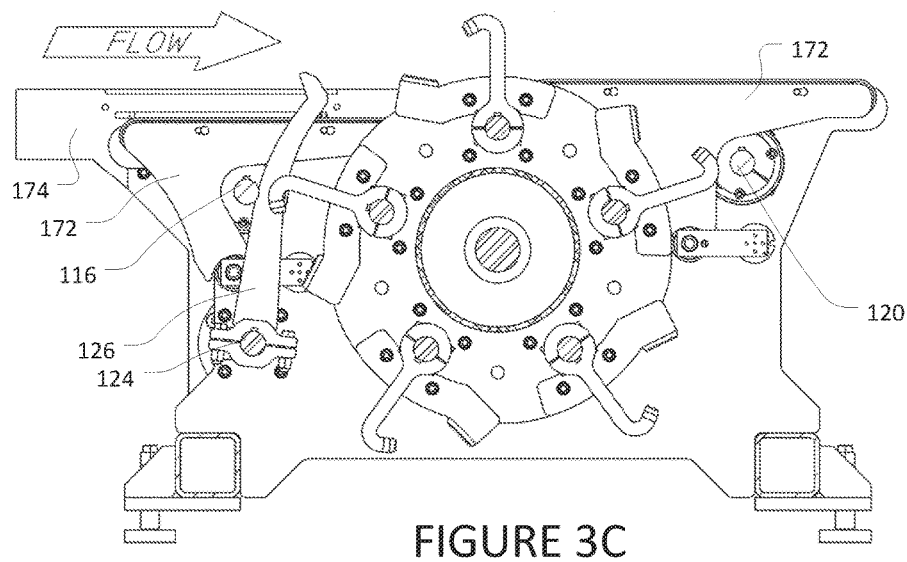

FIGS. 3A, 3B, and 3C illustrate sectional views taken along corresponding lines A-A, B-B, and C-C of FIG. 2, respectively, in accordance with various embodiments. In some embodiments, one or more components of lug loader 100 may be operatively coupled with infeed 138 or outfeed 136. For example, shaft assembly drive 132 may include a jackshaft or other device configured to transfer/synchronize rotational force. As shown in FIG. 3A, shaft assembly drive 132 may be coupled with shaft assembly 104 by a coupler 182, such as a belt or a chain. Optionally, a tensioner 144 may be provided to adjust the tension of coupler 182. Shaft assembly drive 132 may also be coupled with a drive/driven shaft of outfeed 136, such that shaft assembly 104 can be driven by outfeed 136. Alternatively, shaft assembly drive 132 may include an electric drive or other type of drive that is operable to drive shaft assembly 104 independently of outfeed 136 and infeed 138.

Outfeed shaft 120 may be coupled with outfeed drive 122, and infeed shaft 116 may be coupled with infeed drive 118, with one or more corresponding chains, belts, or the like. In some embodiments, stop members 126 may be elongate members that are selectively actuable, by rotation of stop member shaft 124, to hold back and release an incoming workpiece upstream of shaft assembly 104. In some embodiments, stop member shaft 124 may be coupled with shaft assembly 104 and driven by the rotation of shaft assembly 104 (see e.g., FIG. 8B). Alternatively, stop member shaft 124 may be rotated by another component/drive or by any other suitable device. Other embodiments may lack a stop member shaft 124 and/or stop members 126. For example, in some embodiments, a stationary board stop (not shown), such as a plate or other such component, may be provided along supports 114 and/or guards 172 and configured to temporarily halt the leading edge of a workpiece in position to engage a support member 154. As the support member 154 is rotated upwardly, the support member 154 may engage the underside of the workpiece and lift the leading edge of the workpiece above the board stop, allowing the infeed conveyor 128 to advance the workpiece in the flow direction until the clamp member 146 engages the workpiece against the support member 154.

Referring now to FIG. 3B, belts 168 of infeed conveyors 128 and outfeed conveyors 130 may be coupled with corresponding idlers 170 that are mounted on the supports 114 of frame 112. One or more of the idlers 170 and/or belts 168 may be coupled with a tensioner 184. Some or all of the belts 168 of infeed conveyors 128 may be driven by the rotation of infeed shaft 116. Similarly, some or all of the belts 168 of outfeed conveyors 130 may be driven by the rotation of outfeed shaft 120.

As shown for example in FIG. 3C, guards 172 may optionally be coupled with supports 114 with belts 168 disposed between the guards 172 and supports 114. Guards 172 may help to protect belts 168 and idlers 170 from side impacts, dust, and other potential sources of damage. In some embodiments, one or more mounts 174 may also be coupled with supports 114, frame 112, or guards 172. Mounts 174 may be configured to support a sensor (e.g., a scanner, camera, or photo-eye) in a position for monitoring workpiece flow or operations of the lug loader 100 or portions thereof.

Figure 3D:
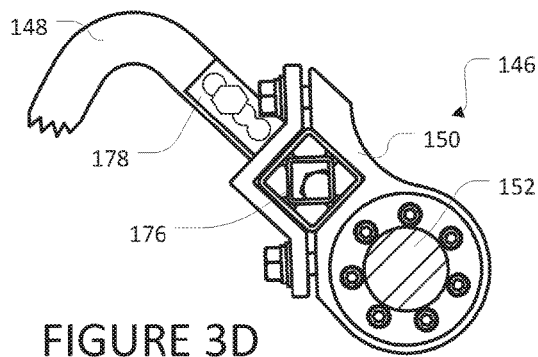
FIGS. 3D-3E illustrate elevational and plan views, respectively, of a clamp member.
Figure 3E:
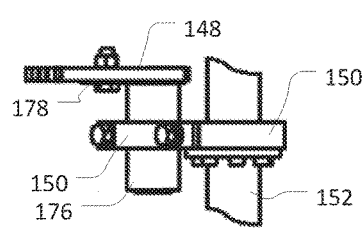
Figure 3F:
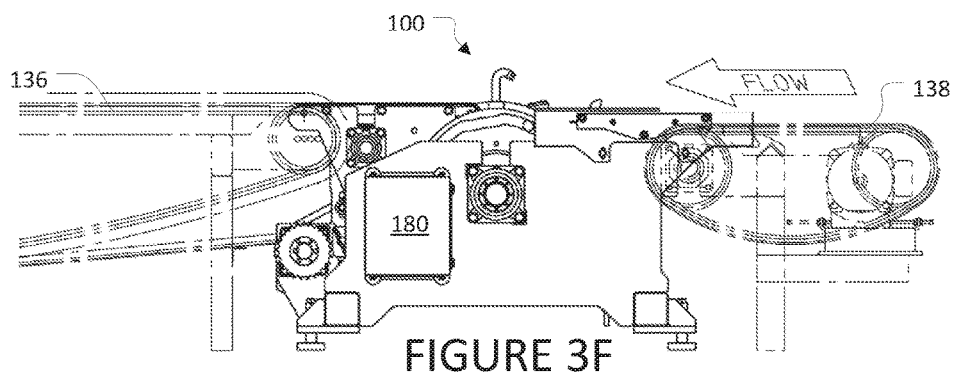
FIG. 3F illustrates a side elevational view of a lug loader.

Clamp members 146 may be arranged along corresponding ones of shafts 152. Shafts 152 may be independently rotatable by corresponding drives 158 in opposite rotary directions (FIG. 3A, arrow A) relative to support members 154. FIGS. 3D-3E illustrate elevational and plan views, respectively, of a clamp member, in accordance with various embodiments.

In some embodiments, clamp members 146 may have a base portion 150 and a hook portion 148 (see e.g., FIG. 3B). Optionally, base portion 150 and hook portion 148 may be individual components configured to be coupled together with bolts or other fasteners. Alternatively, a clamp member 146 or a portion thereof may be formed as a single continuous member that includes both base portion 150 and hook portion 148. In some embodiments, hook portion 148 may have a free end that is coated or coupled with an elastomer or other compressible material to enhance gripping and/or reduce marking of the workpieces by the clamp members 146.

Optionally, one or more of the clamp members 146 may include a tensioner configured to absorb force and/or dampen vibration. The tensioners may allow more force to be applied to thick products and/or allow more travel for thin products. For example, as shown in FIGS. 3D-E, clamp member 146 may include a tensioner 176. In some embodiments, tensioner 176 may be, or may include, an elastomeric component disposed between hook portion 148 and base portion 150. Hook portion 148 and base portion 150 may be coupled together by one or more bolts or other suitable fasteners. In some embodiments, a tensioner may be provided in/along the shaft to isolate the electric drives from impact and to allow further adjustment of clamp members 146 to accommodate various ranges of workpiece thicknesses (see e.g., FIG. 5A, tensioner 192).

In various embodiments, clamp member 146 may include an adjustment member 178. Adjustment member 178 may be adjustably coupled with one or more of base portion 150 and hook portion 148 to allow adjustment of the collective length of clamp member 146. In some embodiments, adjustment member 178 may be adjustably coupled with hook portion 148 by a bolt or other suitable fastener, allowing clamp member 146 to be lengthened and shortened to accommodate different workpiece widths. Optionally, clamp members 146 and/or hook portions 148 may be provided in various lengths to accommodate different workpiece widths. In other embodiments, adjustment member 178 may be configured to allow the angle and/or orientation of hook portion 148 to be adjusted relative to base portion 150.

In various embodiments, clamp members 146 may be selectively movable (via rotation of corresponding shaft 152 by corresponding drive 158) between a clamping position and a releasing position. Thus, the clamping position and the releasing position may correspond to first and second rotational angles of the corresponding shaft 152. In various embodiments, the clamping position and the releasing position may be selective adjustable. Likewise, the point at which the shafts are rotated to move the clamp members into engagement with the corresponding workpieces (clamp actuation point) and away from engagement with the corresponding workpieces (release actuation point) may also be adjustable.

Schematic views of corresponding operations are illustrated by way of example in FIGS. 4A-D, in accordance with various embodiments.

Figure 4B:
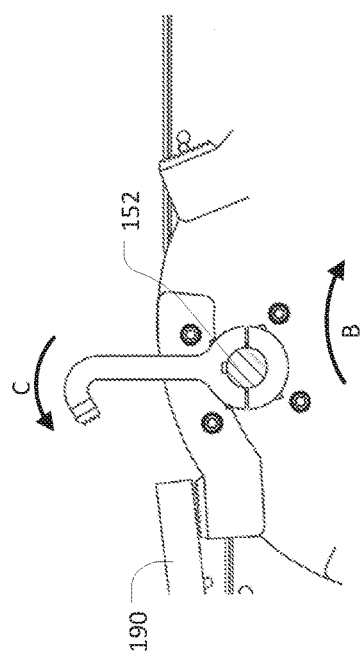
FIGS. 4A-D illustrate schematic views of operations of a lug loader.
Figure 4D:
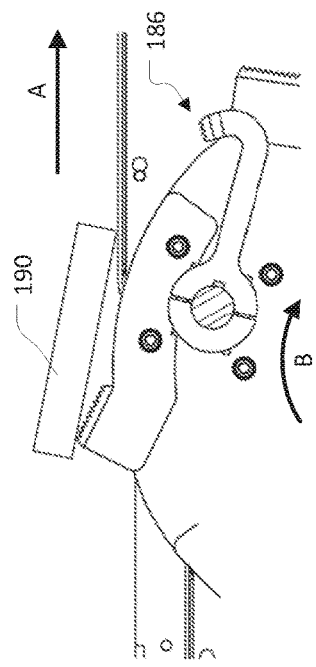
Figure 4A:
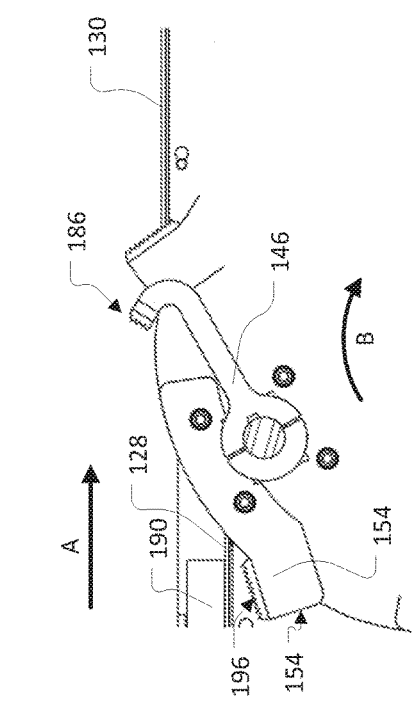

Referring first to FIG. 4A, infeed conveyors 128 may convey an incoming workpiece 190 in a transverse orientation along a path of flow (Arrow A) toward shaft assembly 104. As shaft assembly 104 rotates in a first rotary direction (Arrow B), a set of support members 154 may be moved upwardly toward the workpiece 190.

The support members 154 may be moved along the rotational path into engagement with a lower surface of the workpiece 190 (FIG. 4B). In some embodiments, the support members 154 may lift the leading edge of the workpiece, such that the workpiece is tilted upwardly (e.g., by 5-20 degrees). When a corresponding one of shafts 152 reaches the clamp actuation point along the rotational path, the shaft may be rotated in an opposite second rotary direction (Arrow C) to move the clamp members 146 arrayed thereon toward the workpiece 190. Optionally, before the shaft 152 reaches the clamping position, the lagging end of the workpiece may remain in contact with infeed conveyor 128, and infeed conveyor may continue to urge the workpiece in the direction of flow.

Figure 4C:
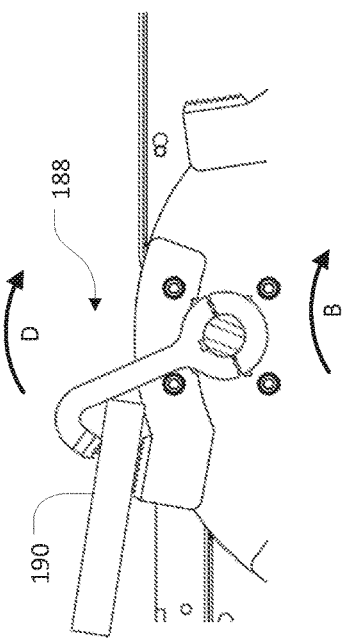

Moving clamp members 146 to the clamping position 188 may bring clamp members 146 into engagement with an upper surface of the workpiece 190, causing the workpiece to be clamped between the clamp members and the corresponding support members 154 (FIG. 4C). Clamping the workpiece and/or continuing the rotation of the shaft assembly 104 may cause the lagging edge of the clamped workpiece may become elevated relative to the leading edge of the workpiece, such that the upper surface of the workpiece is tilted downwardly (e.g., by 10-60 degrees relative to horizontal) as the corresponding support members 154 progress toward the top of the rotational path. When the shaft 152 reaches the release actuation point along the rotational path, the shaft 152 may be rotated in the first rotary direction (Arrow D) to move the clamp members 146 to the release position 186 thereby disengaging the clamp members 146 from the workpiece (FIG. 4D). The support members 154 may continue to urge the workpiece in the direction of flow onto outfeed conveyors 130 while moving along the rotational path as shaft assembly 104 rotates.

In various embodiments, the controller system may be configured to determine, adjust, or select the clamp actuation point and/or release actuation point. In some embodiments the control system may be configured to control the drives to rotate the shafts at the actuation points by actuating the drives individually at time intervals that correspond to the actuation points. In other embodiments the controller may be configured to adjust the actuation points to accommodate variations in workpiece thickness, dimensions, skew angle, intended use (e.g., avoid marking higher grade boards), and various other characteristics. Optionally, the controller may be configured to determine, select, or adjust the clamp/release actuation point(s) based at least in part on one or more of workpiece dimensions/characteristics, input from a human operator, rotational speed of the shaft assembly, speed(s) of infeed/outfeed conveyors, time required for rotation of the shaft, and/or pre-programmed set points (e.g., based on individual workpiece or batch characteristics).

The controller may also be configured to determine, adjust, and/or select the clamping and releasing positions for the clamp members based on workpiece dimensions/characteristics, input from a human operator, rotational speed of the shaft assembly, speed(s) of infeed/outfeed conveyors, time required for rotation of the shaft, and/or pre-programmed set points (e.g., based on individual workpiece or batch characteristics). In some embodiments, the controller may be configured to adjust the clamping position by adjusting the corresponding rotational angle of the shaft (e.g., rotating the shaft more to engage thinner workpieces, rotating it less to engage thicker workpieces).

In some embodiments, the controller may control the clamping/release position as a function of time (e.g., shaft is rotated at a specified speed in a specified direction for a specified duration of time), position (e.g., in terms of the detected rotational angle of the shaft or detected angle of the corresponding clamp members), and/or torque (e.g., shaft is rotated until a specified amount of torque is applied, as measured by current sensing on the shaft's corresponding drive/motor).

The clamping and releasing positions may also be configurable (e.g., by the controller and/or via input from a human operator) in various ways among embodiments. For example, in some embodiments that do not use torque sensing to determine clamping/releasing positions, the drives (e.g., motors) that drive the shafts may have a maximum current limit in order to limit the amount of torque and thereby avoid crushing the workpiece as the clamp members engage the workpiece. Thus, in some embodiments the drivers of the shafts may have a selectively configurable maximum current limit that allows the control system and/or operator to limit the force applied to the workpiece. The maximum current limit may be adjustable on a batch basis, for example, such that the maximum current can be raised for handling workpieces capable of withstanding greater force (e.g., Doug fir boards) and lowered for handling workpieces that mark easily (e.g., cedar boards).

In various embodiments, the clamp actuation point, release actuation point, the clamping and releasing positions, and/or other variables such as maximum current limit, rotational speed of the shaft assembly, speed(s) of infeed/outfeed conveyors, time required for rotation of the shaft, and/or pre-programmed set points (e.g., based on individual workpiece or batch characteristics) may be adjusted or controlled individually by input from a human operator and/or automatically by the control system. In various embodiments, the control system may be programmed with instructions operable, when executed by a processor, to control various operations of the singulator/lug loader based on sensor data, workpiece/batch characteristics, or a set of pre-determined operational parameters. For example, for a 1×4 board, the control system may be programmed to clamp the board at 0 degrees of rotation, release the board at 100 degrees of rotation, and set the clamping position based on a target gap of 0.75" between the end of the clamp member and the corresponding support member when the clamp members are in the clamping position. As another example, for a 2×10 board, the control system may be programmed to clamp the board at 0 degrees of rotation, release the board at 95 degrees of rotation, and set the clamping position based on a target gap of 1.70" between the end of the clamp member and the corresponding support member when the clamp members are in the clamping position.

In some embodiments, the controller may be configured to operate shaft assembly 104 and components thereof to deposit the workpiece onto outfeed conveyor 130 in its initial orientation, with the lower surface in contact with the outfeed conveyor. In other embodiments, the controller may be configured to operate shaft assembly 104 and components thereof to flip/turn the workpiece onto outfeed conveyors 130. In still other embodiments, the controller may be configured to select a preferred orientation for the workpiece from among two or more possible orientations (e.g., the initial orientation and an inverted orientation) and to operate shaft assembly 104 and components thereof to deposit the workpiece onto outfeed conveyor 130 in the preferred orientation.

For example, the controller may be configured to selectively control the rotation of shaft 152 to release the workpiece at a first position along the rotational path to deposit the workpiece onto the outfeed conveyors in a first orientation (e.g., the initial orientation) or at another position along the rotational path to deposit the workpiece onto the outfeed conveyors in a second orientation (e.g., the inverted orientation with the workpiece flipped/turned axially 180 degrees relative to the initial orientation).

In various embodiments, the controller may be selectively operable to deposit the workpiece onto the outfeed in its initial orientation by causing shaft 152 to rotate and release the workpiece as the corresponding support members 154 are approaching the top of the rotational path, or are at or near the top of the rotational path, or shortly after they begin to move downwardly along the rotational path toward the outfeed conveyors. In some embodiments, the support members 154 may be configured to support the workpiece on a forward surface 196 and/or on a top or rearward surface 198 of support members 154 as the leading edge of the workpiece contacts the outfeed conveyors.

Optionally, the controller may be selectively operable to flip/turn the workpiece by causing shaft 152 to be rotated at a slower rate and/or at a location further along the rotational path (e.g., as the corresponding support members 154 are moving downwardly toward the outfeed conveyors 130). As the workpiece is released, the angle of the workpiece (e.g., 60-160 degrees relative to horizontal) and/or the greater velocity of the lagging edge of the workpiece relative to the leading edge may cause the workpiece to turn 180 degrees around its longitudinal axis, such that the workpiece is deposited on the outfeed conveyor with the lower portion of the workpiece facing upwardly. In some embodiments, the outfeed conveyor may be controlled to stop or the speed of the outfeed conveyor may be varied while in contact with the leading edge of the workpiece to facilitate the turning of the workpiece.

In some embodiments, the controller may be programmed with clamping and releasing positions and/or the corresponding rotational angles of the shafts 152. For example, the controller may be programmed with a releasing position 146 that corresponds to a rotational angle of 0 degrees (of shaft 152), and a clamping position 148 that corresponds to a rotational angle of 90 degrees (of shaft 152). Thus, the controller may be configured to selectively control the corresponding drive 158 to rotate the corresponding shaft 152 between 0 and 90 degrees.

The clamping/releasing positions may be adjustable and/or configurable for different workpiece thicknesses. In some embodiments, the controller may be configured to adjust the clamping/releasing positions of the clamp members along one or more shafts by adjusting the rotational angles of the corresponding shaft(s) 152. For example, the controller may be configured to increase or decrease the rotational angle associated with the clamping position based on workpiece dimension(s) and/or input from an operator. Alternatively, the clamping/releasing positions may be adjusted by manually adjusting the relative position, dimension, and/or orientation of the clamp members 146, support members 154, and/or portion(s) thereof. In other embodiments, the clamping/releasing positions of the clamp members may be adjustable based on force/torque sensing through the electric drive.

FIGS. 5 and 6 illustrate perspective views of a shaft assembly, all in accordance with various embodiments. As shown for example in FIG. 6, in some embodiments a tensioner 192 may be provided along shafts 152. For example, tensioner 192 may be disposed between shaft 152 and corresponding clamp members 146. In some embodiments, shafts 152 may include one or more tensioner seats 194, such as grooves or other surface contours that are configured to help retain tensioners 192 in place relative to the shaft 152. Optionally, clamp members 146 may have a tensioner seat or a surface contour (e.g., a groove or notch) configured to accommodate tensioner 192. Tensioners 192 may be, or may include, an elastomeric or other compressible material. In various embodiments, tensioners 192 may be configured to reduce vibration or impact forces against the clamp members or corresponding drives, and/or to provide further thickness range adjustment.

In various embodiments, one end of each shaft 152 may be coupled with a corresponding drive 158. The other end of each shaft 152 may be coupled with an end-most one of discs 156. In some embodiments, drives 158 may include a servo motor and a gear reducer. Optionally, discs 156 may be generally annular with a central void, and shaft housing 164 may be disposed through the central voids of some or all of the discs 156 with shafts 152 arranged radially around shaft housing 164 and disposed through slots in the outer periphery of discs 156. Optionally, shaft housing support 166 may include a shaft/pipe disposed through one end of shaft housing 164 and another shaft/pipe disposed through the opposite end of shaft housing 164.

In some embodiments, support members 154 may be projections or other surface features of discs 156. For example, the outer edges of discs 156 may have projections that extend outwardly and are arranged between adjacent ones of shafts 152 (e.g., in an alternating configuration), and the projections may be the support members 154 or a portion thereof. Alternatively, support members 154 may be components configured to be coupled with discs 156. For example, support members 154 may include metal plates configured to be removably/adjustably coupled with a corresponding disc 156 by bolts or other types of fasteners. In other embodiments support members 154 may be permanently coupled with a corresponding disc 156.

In various embodiments, discs 156 may have an outer periphery with a plurality of apertures 200, and shafts 152 may be disposed through the apertures 200. In some embodiments, apertures 200 may be open-ended slots defined in the outer edge of the disc 156. Support members 154 may be removably coupled with discs 156 to extend across the open end of the slots. This configuration may allow shafts 152 to be inserted/removed by removing the corresponding support members 154. Alternatively, a plate or other suitable item may be removably coupled with discs 156 across the open ends of the slots to secure shafts 152 within the slots.

Figure 7:
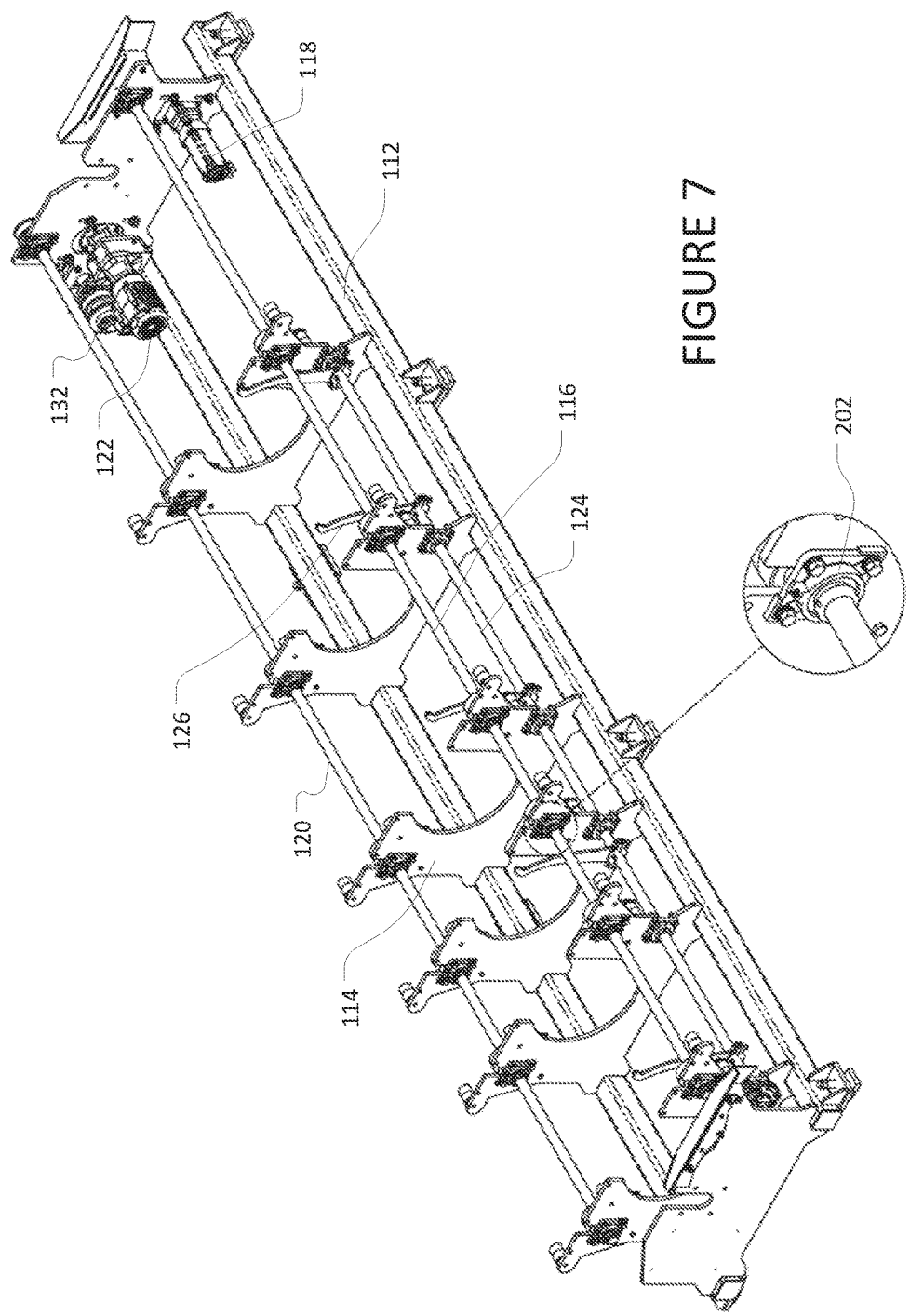
FIG. 7 illustrates a perspective view of a conveyor assembly.
Figure 9A:
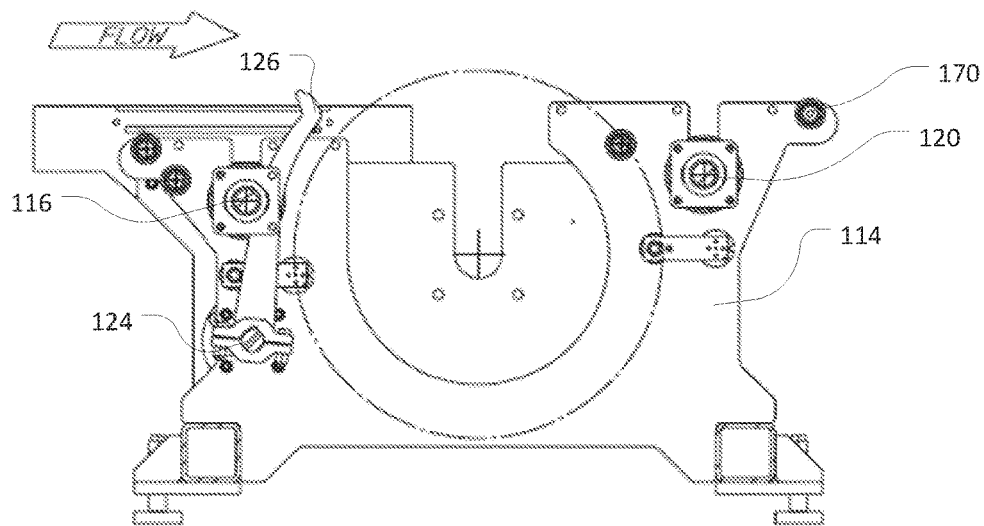
FIGS. 9A-9B illustrate sectional views taken along corresponding lines of FIG. 8B.
Figure 9B:
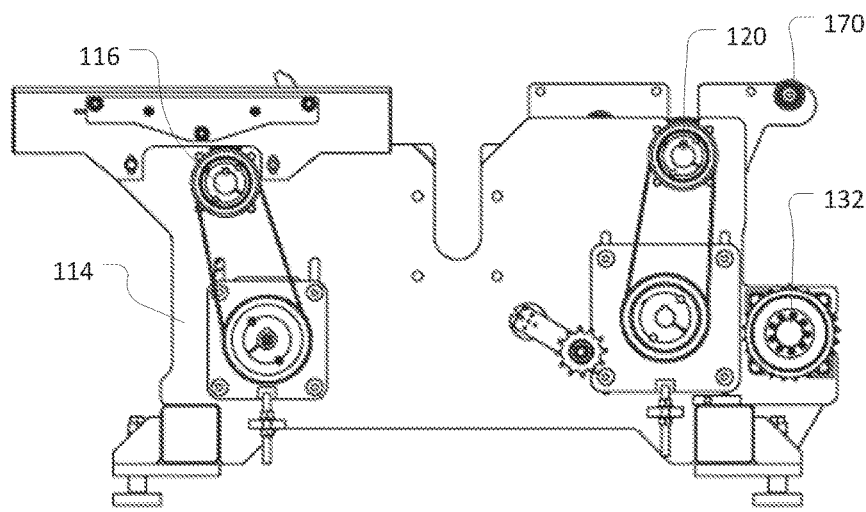

FIGS. 7-8B illustrate additional views of a conveyor assembly, in accordance with various embodiments. FIGS. 9A and 9B illustrate sectional views taken along lines A-A and B-B of FIG. 8B.

In some embodiments, infeed shaft 116 and outfeed shaft 120 may be disposed through some or all of supports 114. For example, as best shown in FIG. 7, an upper end of supports 114 may have apertures (e.g., open-ended slots) therein, and infeed shaft 116 and outfeed shaft 120 may be positioned within the apertures. Optionally, bearings 202 may be positioned within the apertures and removably coupled with supports 114, and infeed shaft 116/outfeed shaft 120 may be disposed through the bearings 202. This configuration may allow for convenient removal or replacement of the infeed/outfeed shafts.

In some embodiments, a drive may be coupled with the stop member shaft 124. As best shown in FIGS. 8A and 8B, stop member shaft 124 may be coupled with infeed shaft 116 by a coupler 204, such as a belt or a chain, allowing stop member shaft 124 to be driven by infeed drive 118. In other embodiments, a separate drive may be coupled with stop member shaft 124. In various embodiments, the stop members 124 and stop member shaft 126 may be driven by a cam, a servo motor or a pneumatic cylinder. Some embodiments may include a control module 206 with one or more manual controls. For example, control module 206 may include a button, switch, or other manual control that is actuable by a human operator to stop the workpiece singulator and/or the conveyor system, or some portion thereof. Optionally, control module 206 may have a button, switch, or other manual control that is actuable by a human operator to start or change the speed of the workpiece singulator and/or the conveyor system, or some portion thereof. In other embodiments, control module 206 may include one or more sensors configured to detect a position/dimension of a workpiece.

In various embodiments, some or all of the drives 118, 122, 132, 140, 158, 160, and/or 204 may be in communication with a controller (e.g., controller 300). The controller may be configured to synchronize the drives to engage successive workpieces between the clamp members and the support members and deposit the workpieces onto a lugged conveyor. In some embodiments, the electric drives of the rotatable shaft assembly may be in communication with the controller through a slip ring assembly coupled with the shaft assembly. In other embodiments, the electric drives and controller may be communicatively coupled by any other suitable device or mechanism. Optionally, the controller may be coupled with one or more sensors (e.g., cameras, photoeyes, etc.) configured to detect the presence and/or dimensions of the workpieces, and the controller may be configured to selectively adjust/synchronize operation of some or all of the drives based at least on data from the sensor(s).

Figure 10:
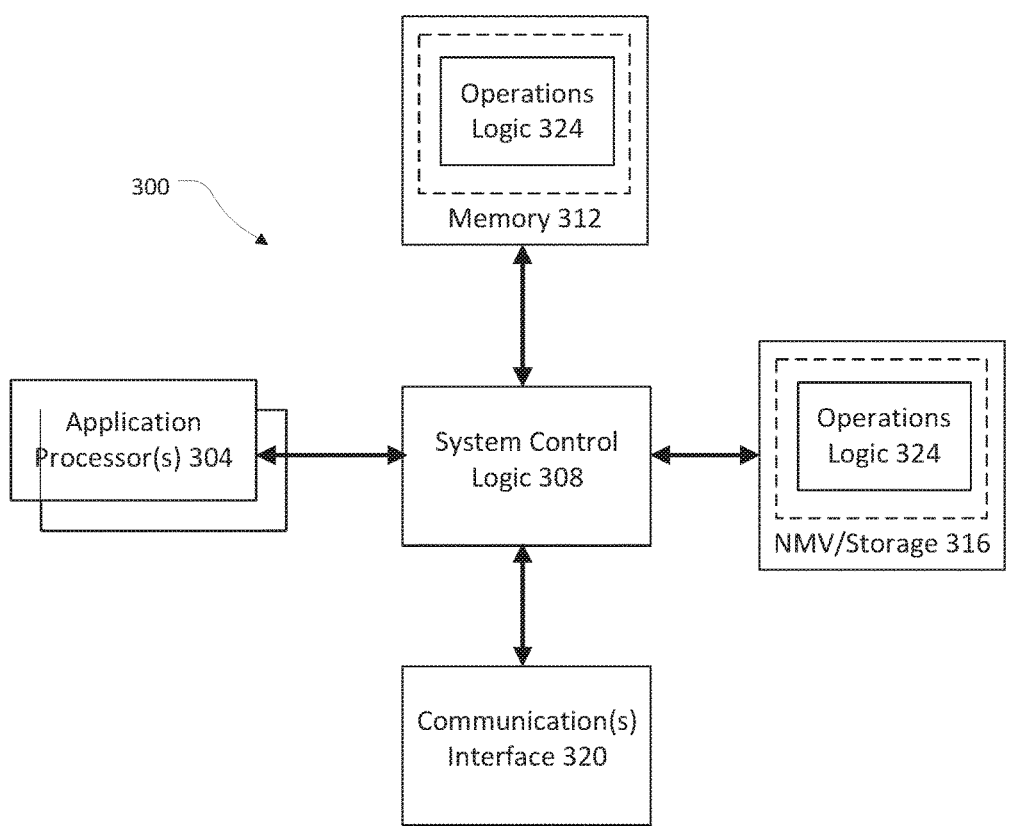
FIG. 10 is a schematic diagram of a controller.

FIG. 10 is a schematic diagram of a controller 300 (e.g., a PLC or other computer system) suitable for practicing embodiments of the present disclosure. In some embodiments, controller 300 may have some or all of the features/functionality described above with regard to controller 300. As illustrated, controller 300 may include control logic 308 coupled to at least one of the processor(s) 304, system memory 312 coupled to system control logic 308, non-volatile memory (NVM)/storage 316 coupled to system control logic 308, and one or more communications interface(s) 320 coupled to system control logic 308. In various embodiments the one or more processors 304 may be a processor core.

System control logic 308 for one embodiment may include any suitable interface controller(s) to provide for any suitable interface to at least one of the processor(s) 304 and/or to any suitable device or component in communication with system control logic 308. System control logic 308 may also interoperate with a display 306 for display of information, such as to a user. In various embodiments the display may include one of various display formats and forms, such as, for example, liquid-crystal displays, cathode-ray tube displays, and e-ink displays. In various embodiments the display may include a touch screen.

System control logic 308 for one embodiment may include one or more memory controller(s) to provide an interface to system memory 312. System memory 312 may be used to load and store data and/or instructions, for example, for controller 300. In one embodiment system memory 312 may include any suitable volatile memory, such as suitable dynamic random access memory ("DRAM").

System control logic 308, in one embodiment, may include one or more input/output ("I/O") controller(s) to provide an interface to NVM/storage 316 and communications interface(s) 320.

NVM/storage 316 may be used to store data and/or instructions, for example. NVM/storage 316 may include any suitable non-volatile memory, such as flash memory, for example, and/or may include any suitable non-volatile storage device(s), such as one or more hard disk drive(s) ("HDD(s)"), one or more solid-state drive(s), one or more compact disc ("CD") drive(s), and/or one or more digital versatile disc ("DVD") drive(s), for example.

The NVM/storage 316 may include a storage resource that may physically be a part of a device on which the controller 300 is installed, or it may be accessible by, but not necessarily a part of, the device. For example, the NVM/storage 316 may be accessed over a network via the communications interface(s) 320.

System memory 312, NVM/storage 316, and system control logic 308 may include, in particular, temporal and persistent copies of operations logic 324. The operations logic 324 may include instructions that are operable, upon execution by at least one of the processor(s) 304, to cause the controller 300 to control the operation of one or more of the drives as generally described above. Communications interface(s) 320 may provide an interface for controller 300 to communicate over one or more network(s) and/or with any other suitable device. Communications interface(s) 320 may include any suitable hardware and/or firmware, such as a network adapter, one or more antennas, a wireless interface, and so forth. In various embodiments, communication interface(s) 320 may include an interface for controller 300 to use NFC, optical communications (e.g., barcodes), BlueTooth or other similar technologies to communicate directly (e.g., without an intermediary) with another device. In various embodiments, the wireless interface may interoperate with radio communications technologies such as, for example, WCDMA, GSM, LTE, and the like.

The capabilities and/or performance characteristics of processors 304, memory 312, and so forth may vary. In various embodiments, controller 300 may be, but not limited to, a computing tablet, a laptop computer, a desktop computer, a server, a PLC, or any combination thereof. In various embodiments controller 300 may include a PLC operatively coupled with a computer system and/or one or more sensors.

In one embodiment, at least one of the processor(s) 304 may be packaged together with system control logic 308 and/or operations logic 324. For example, at least one of the processor(s) 304 may be packaged together with system control logic 308 and/or operations logic 324 to form a System in Package ("SiP"). Alternatively, at least one of the processor(s) 304 may be integrated on a die with system control logic 308 and/or operations logic 324 (e.g., as a System on Chip ("SoC")).

Figure 11:
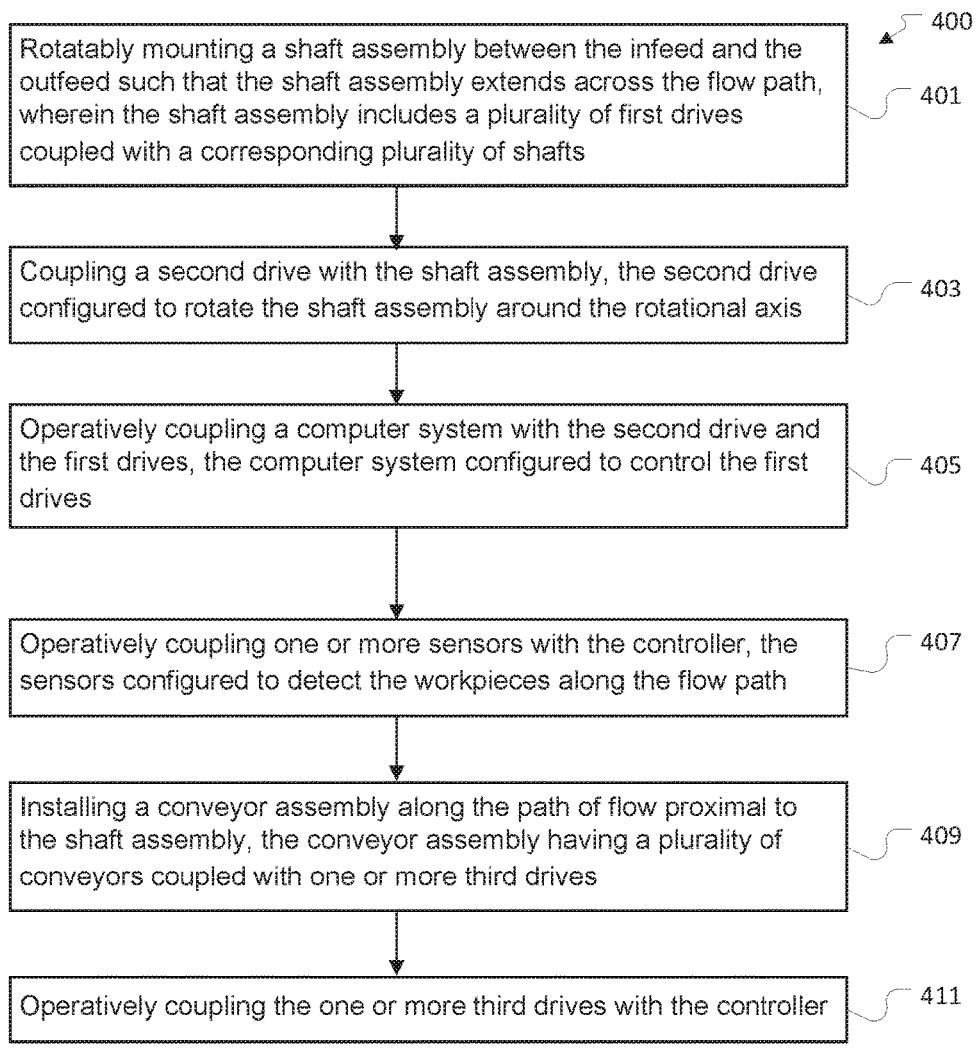
FIG. 11 is a flow diagram of a method for modifying a lumber handling system.

FIG. 11 is a flow diagram of a method 400 for modifying a lumber handling system, in accordance with various embodiments. The lumber handling system (e.g., lug loader 100) may have an infeed (e.g., infeed 138 or infeed conveyors 128) and an outfeed (e.g., outfeed 136 or outfeed conveyors 130) configured to convey elongate workpieces in a transverse orientation along a flow path.

At block 401, a shaft assembly (e.g., shaft assembly 104) may be rotatably mounted between the infeed and the outfeed such that the shaft assembly extends across the flow path. The shaft assembly may have a generally horizontal rotational axis and a plurality of generally parallel first shafts (e.g., shafts 152) arranged radially around the rotational axis. The shaft assembly may further include a plurality of clamp members (e.g., clamp members 146) coupled with each of the first shafts, a plurality of discs (e.g. discs 156) arranged along the rotational axis and coupled with the first shafts, and a plurality of first drives (e.g., drives 158). Each of the first drives may be coupled with a corresponding one of the first shafts. In some embodiments, the first drives may be electric drives.

At block 403, a second drive (e.g., shaft assembly drive 132) may be coupled with the shaft assembly. The second drive may be operable to rotate the shaft assembly around the rotational axis. In some embodiments, the second drive may include or may be coupled with a drive (e.g., outfeed drive 122) that is coupled with the outfeed, such that the second drive is operable to drive both the shaft assembly and the outfeed.

At block 405, a controller (e.g., controller 300) may be operatively coupled with the second drive and the first drives. The controller may be configured to selectively control the first drives to engage successive ones of the workpieces between the clamp members and the discs while the shaft assembly is rotated by the second drive. In some embodiments, operatively coupling the controller with the second drive and the first drives may include coupling a slip ring with the controller and the first drives.

At block 407, one or more sensors (e.g., sensors 142) may be coupled with the controller. The sensor(s) may be configured to detect the workpieces along the flow path. In various embodiments, the sensor(s) may be configured to detect a workpiece position and/or one or more workpiece dimensions.

At block 409, a conveyor assembly (e.g., conveyor system/assembly 106) may be installed along the path of flow proximal to the shaft assembly. The conveyor assembly may have a frame (e.g., frame 112), a plurality of conveyors (e.g., infeed conveyors 128 and/or outfeed conveyors 130) mounted to the frame and oriented generally parallel to the path of flow, and one or more third drives (e.g., infeed drive 118 and/or outfeed drive 122) operatively coupled with the conveyors. Optionally, rotatably mounting the shaft assembly may include rotatably mounting the shaft assembly to the frame. In various embodiments, some of the conveyors may be positioned upstream of the shaft assembly and others of the conveyors may be positioned downstream of the shaft assembly. Alternatively, all of the conveyors may be positioned upstream of the shaft assembly, or all of the conveyors may be positioned downstream of the shaft assembly.

At block 411, the one or more third drives may be operatively coupled with the controller. In one embodiment, a first group of the conveyors may be mounted to an upstream portion of the frame and coupled with one of the one or more third drives, a second group of the conveyors may be mounted to a downstream portion of the frame and coupled with another one of the one or more third drives. The controller may be configured to operate the first group of the conveyors independently of the second group of the conveyors.

Figure 12:
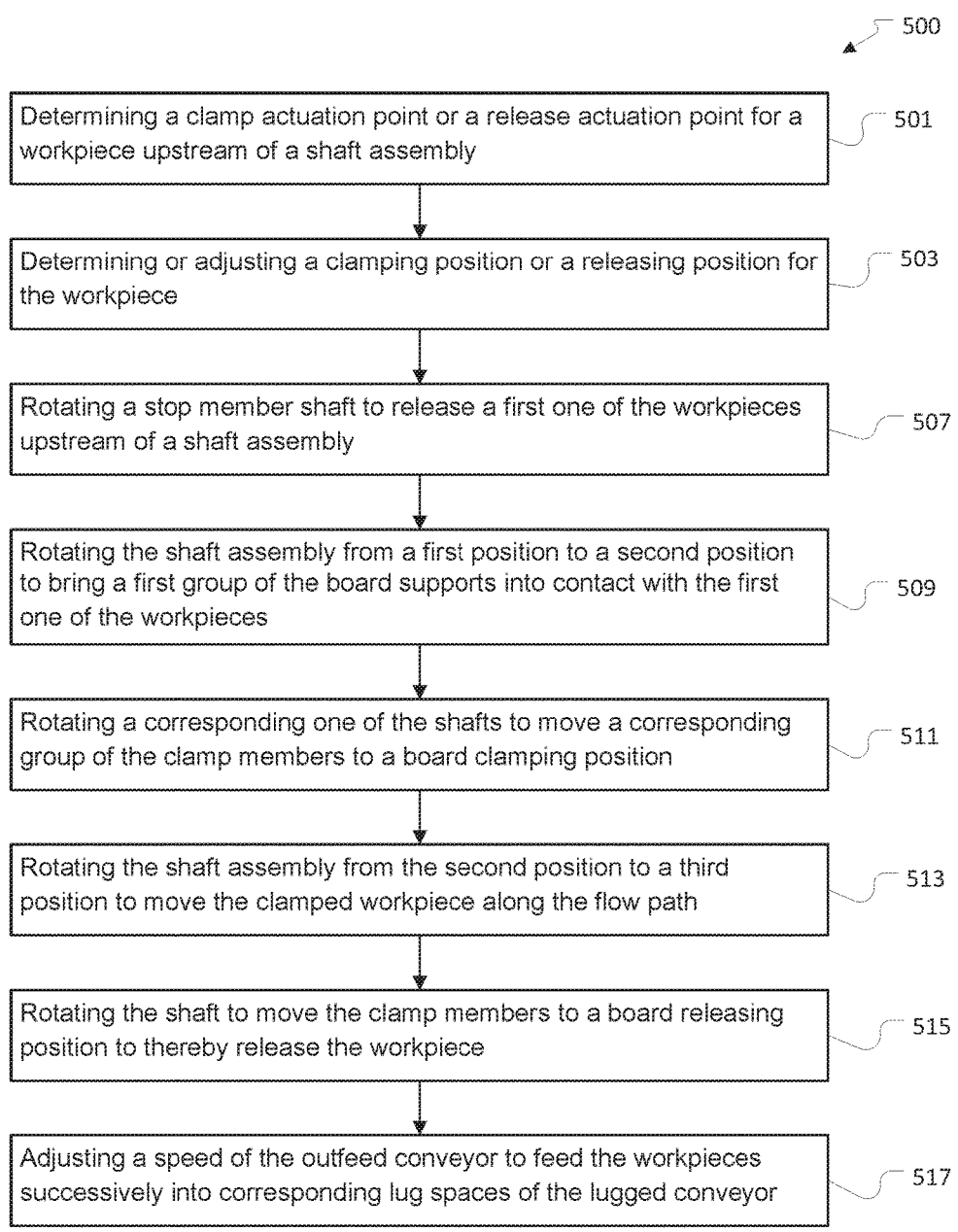
FIG. 12 is a flow diagram of a method of using a lug loader to load elongate workpieces onto a lugged conveyor, all in accordance with various embodiments.

FIG. 12 is a flow diagram of a method 500 of using a lug loader to load elongate workpieces onto a lugged conveyor, in accordance with various embodiments. The elongate workpieces may be traveling in a transverse orientation along a flow path onto the lugged conveyor (e.g., outfeed 136) downstream of the lug loader (e.g., lug loader 100). The lug loader may have a shaft assembly (e.g., shaft assembly 104) with a rotational axis and a plurality of first shafts (e.g., shafts 152) arranged radially around the rotational axis, a plurality of clamp members (e.g., clamp members 146) coupled with each of the first shafts, and a plurality of support members (e.g., support members 154) arranged along the rotational axis and coupled with the first shafts. In various embodiments, the lug loader may also include a plurality of stop members (e.g., stop members 126) arranged along a stop member shaft (e.g., stop member shaft 124).

In some embodiments, method 500 may begin at block 501. At block 501, a clamp actuation point and/or a release actuation point may be determined. Optionally, the actuation point(s) may be determined by a controller/control system or set by a human operator generally as described above.

Optionally, at block 503, a clamping position and/or a releasing position may be determined. Optionally, the actuation point(s) may be determined by a controller/control system or set by a human operator generally as described above.

At block 505, the stop member shaft may be rotated to release a first one of the workpieces upstream of the shaft assembly.

At block 507, the shaft assembly may be rotated from a first position to a second position to bring a first group of the board supports into contact with a first one of the workpieces.

At block 509, a corresponding one of the first shafts may be rotated to move a corresponding first group of the clamp members to a clamping position to thereby engage said first one of the workpieces between the first group of support members and the first group of clamp members.

At block 511, the shaft assembly may be rotated from the second position to a third position to move the clamped workpiece along the flow path.

At block 513, the corresponding one of the first shafts may be rotated to move the first group of the clamp members to a releasing position to thereby release said first one of the workpieces.

In some embodiments, the lug loader may include an outfeed conveyor (e.g., outfeed conveyors 130) between the shaft assembly and the lugged conveyor. In such embodiments, at block 515 a speed of the outfeed conveyor may be adjusted to feed the workpieces successively into corresponding lug spaces of the lugged conveyor.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. An apparatus for singulating elongate workpieces translating along a flow path in a generally transverse orientation, the apparatus comprising:
a shaft assembly rotatably mounted across the flow path, the shaft assembly including a shaft disposed along a rotational axis of the shaft assembly, a plurality of sets of clamp members coupled with the shaft and arranged radially around the rotational axis, wherein each of the sets of clamp members includes two or more clamp members spaced apart along a corresponding axis that is parallel to the rotational axis, a plurality of support members coupled with the shaft and arranged in cooperation with the clamp members, and a plurality of first drives, each of the first drives independently coupled with a corresponding one of the sets of clamp members, wherein each of the first drives is operable to rotate the corresponding one of the sets of clamp members, independently of the other sets of clamp members, between a releasing position and a clamping position.

2. The apparatus of claim 1, wherein the first drives are electric servo drives, and wherein a maximum current limit of the first drives is adjustable.

3. The apparatus of claim 1, wherein the shaft assembly further includes a shaft housing with opposite ends, the shaft is disposed through one or both of the ends of the shaft housing and is coupled thereto, and the support members are coupled to the shaft housing.

4. The apparatus of claim 3, wherein each of the sets of clamp members is operatively coupled with a corresponding one of the first drives by a respective second shaft, and the second shafts are arranged radially around the rotational axis and oriented generally parallel thereto.

5. The apparatus of claim 1, wherein the first drives are selectively operable to rotate the corresponding sets of clamp members in opposite rotary directions.

6. The apparatus of claim 5, further including a plurality of discs coupled to the shaft and arranged generally orthogonal to the rotational axis, wherein the support members are coupled to the discs.

7. The apparatus of claim 5, further including a plurality of discs coupled to the shaft and arranged generally orthogonal to the rotational axis, wherein the support members are projections of an outer edge of the discs, such that the support members are integral to the discs.

8. A system for handling elongate workpieces translating along a flow path in a first direction and orientated generally transverse to the flow path, the system comprising:
a frame having opposite ends and a longitudinal axis that extends through said ends;
a shaft assembly supported by the frame and rotatable relative thereto about a generally horizontal rotational axis, the shaft assembly including a shaft disposed along the rotational axis, a plurality of sets of clamp members coupled with the shaft and arranged radially around the rotational axis, wherein each of the sets of clamp members includes two or more clamp members spaced apart along a corresponding axis that is parallel to the rotational axis, and a plurality of support members coupled with the shaft and arranged in cooperation with the clamp members;

a drive system coupled with the shaft assembly, wherein the drive system includes a plurality of first drives, and each of the first drives is operable to rotate a corresponding one of the sets of clamp members, independently of the other sets of clamp members, between a clamping position and a releasing position; and a controller operatively coupled with the drive system and configured to determine the clamping position based at least on one or more workpiece characteristics, torque, or input from a human operator.

9. The system of claim 8, wherein the drive system further includes a second drive coupled with the shaft assembly, the second drive operable to rotate the shaft assembly around the rotational axis.

10. The system of claim 8, further including one or more sensors positioned along the flow path and operatively coupled with the controller, the one or more sensors configured to detect a thickness of the workpieces, wherein the controller is configured to determine the clamping position based at least on the thickness of the workpieces.

11. The system of claim 8, wherein the first drives are electric servo drives, and wherein a maximum current limit of the first drives is adjustable.

12. The system of claim 8, wherein the clamping position is one of a plurality of clamping positions stored in association with corresponding workpiece dimensions in a look-up table or database, and the controller is configured to determine the clamping position by retrieving the clamping position from the look-up table or database based on a workpiece thickness.

13. The system of claim 8, wherein the shaft assembly further includes a shaft housing with opposite ends, the shaft is disposed through one or both of the ends of the shaft housing and is coupled thereto, and the support members are coupled to the shaft housing.

14. The system of claim 13, wherein each of the sets of clamp members is operatively coupled with a corresponding one of the first drives by a respective second shaft, and the second shafts are arranged radially around the rotational axis and oriented generally parallel thereto.

15. A method of modifying a lumber handling system, wherein the lumber handling system has a conveyor configured to convey elongate workpieces in a transverse orientation along a flow path, the method comprising:

rotatably mounting a shaft assembly at an upstream or downstream end of the conveyor such that the shaft assembly extends across the flow path, wherein the shaft assembly has a shaft disposed along a generally horizontal rotational axis of the shaft assembly, a plurality of sets of clamp members coupled with the shaft and arranged radially around the rotational axis, wherein each of the sets of clamp members includes two or more clamp members spaced apart along a corresponding axis that is parallel to the rotational axis, a plurality of support members coupled with the shaft and arranged in cooperation with the clamp members, and a plurality of first drives coupled with corresponding ones of the sets of clamp members, wherein each of the first drives is operable to rotate a corresponding one of the sets of clamp members, independently of the other sets of clamp members, between a releasing position and a clamping position;

coupling a second drive with the shaft assembly, wherein the second drive is configured to rotate the shaft assembly around the rotational axis; and operatively coupling a controller with the second drive and the first drives, wherein the controller is configured to determine the clamping position based at least on one or more workpiece characteristics, torque, or input from a human operator.

16. The method of claim 15, wherein the conveyor is driven by one or more third drives, the method further including operatively coupling the one or more third drives with the controller.

17. The method of claim 15, further including operatively coupling one or more sensors with the controller, the sensors configured to detect the workpieces along the flow path.

18. The method of claim 17, wherein the one or more sensors is configured to detect a thickness of a workpiece, and the controller is configured to determine the clamping position based at least on the detected thickness of the workpiece.

19. The method of claim 15, wherein the shaft assembly further includes a shaft housing with opposite ends, the shaft extends through one or both of the ends of the shaft housing and is coupled thereto, and the support members are coupled to the shaft housing.

20. The method of claim 19, wherein each of the sets of clamp members is operatively coupled with a corresponding one of the first drives by a respective second shaft, and the second shafts are arranged radially around the rotational axis and oriented generally parallel thereto.

* * * * *